US012592825B2

(12) United States Patent
      Crystal

(10) Patent No.: US 12,592,825 B2
(45) Date of Patent: Mar. 31, 2026

(54) METHODS AND SYSTEMS OF FACILITATING AUTHENTICATION FOR ACCESSING A SERVICE

(71) Applicant: Douglas Eric Crystal, Chagrin Falls, OH (US)

(72) Inventor: Douglas Eric Crystal, Chagrin Falls, OH (US)

( * ) Notice: Subject to any disclaimer, the term of this patent is extended or adjusted under 35 U.S.C. 154(b) by 37 days.

(21) Appl. No.: 18/933,896

(22) Filed: Oct. 31, 2024

(65) Prior Publication Data

US 2025/0141686 A1     May 1, 2025

Related U.S. Application Data

(60) Provisional application No. 63/594,881, filed on Oct. 31, 2023.

(51) Int. Cl.
      *H04L 9/32*          (2006.01)
(52) U.S. Cl.
      CPC .................................. *H04L 9/3213* (2013.01)
(58) Field of Classification Search
      CPC ...................................................... H04L 9/3213
      See application file for complete search history.

(56) References Cited

U.S. PATENT DOCUMENTS

| | | | |
|---|---|---|---|
| D323,446 S | 1/1992 | Morse | |
| 9,575,815 B1 | 2/2017 | Guthrie et al. | |
| 12,314,430 B1 * | 5/2025 | Hardt .................. | G06F 21/6245 |
| 12,316,621 B1 * | 5/2025 | Mohassel ............ | H04L 63/0421 |

| | | | |
|---|---|---|---|
| 12,526,270 B2 * | 1/2026 | Toff ...................... | H04L 63/083 |
| 2019/0273746 A1 | 9/2019 | Coffing | |
| 2023/0092092 A1 | 3/2023 | Wu et al. | |
| 2025/0141869 A1 * | 5/2025 | Avetisov ............. | H04L 63/0876 |
| 2025/0165569 A1 * | 5/2025 | Kronenberg ........... | G06F 21/31 |
| 2025/0182104 A1 * | 6/2025 | Prokop ................ | G06Q 20/027 |
| 2025/0220002 A1 * | 7/2025 | Nambula .............. | H04L 9/0825 |
| 2025/0284780 A1 * | 9/2025 | Kronenberg ........... | G06F 21/31 |
| 2025/0291648 A1 * | 9/2025 | Mahoney ............... | G06F 9/541 |
| 2025/0337736 A1 * | 10/2025 | Drechsler ............. | G06Q 20/02 |
| 2026/0019237 A1 * | 1/2026 | Kapur .................. | H04L 9/0825 |

OTHER PUBLICATIONS

Authentication sidecar—a new experience in microservice architecture (Part two), retrieved from the internet, retrieved on Oct. 30, 2024; <URL: https://www.thoughtworks.com/en-us/insights/blog/architecture/authentication-sidecar-a-new-experience-in-microservice-architecture-part-two#:~:text=The%20frontend%20sends%20a%20request,the%20sidecar%20rejects%20the%20request.>.

* cited by examiner

*Primary Examiner* — Stephen T Gundry

(57)                ABSTRACT

The present disclosure provides a method of facilitating authentication for accessing a service. Further, the method may include receiving a first API call which includes a first key. Further, the method may include generating a first process session key and a first response including a first token based on a key validity data. Further, the method may include transmitting the first process session key to the user device and the first response to the user device sidecar. Further, the method may include receiving a second API call which includes the first token. Further, the method may include generating a second process session key and a second response based on a token validity. Further, the method may include transmitting the second process session key to the user device and the second response to the user device sidecar.

20 Claims, 21 Drawing Sheets

-A FIRST API CALL
-A FIRST PROCESS SESSION KEY
-A FIRST RESPONSE
-A SECOND API CALL
-A SECOND PROCESS SESSION
  KEY
-A SECOND RESPONSE

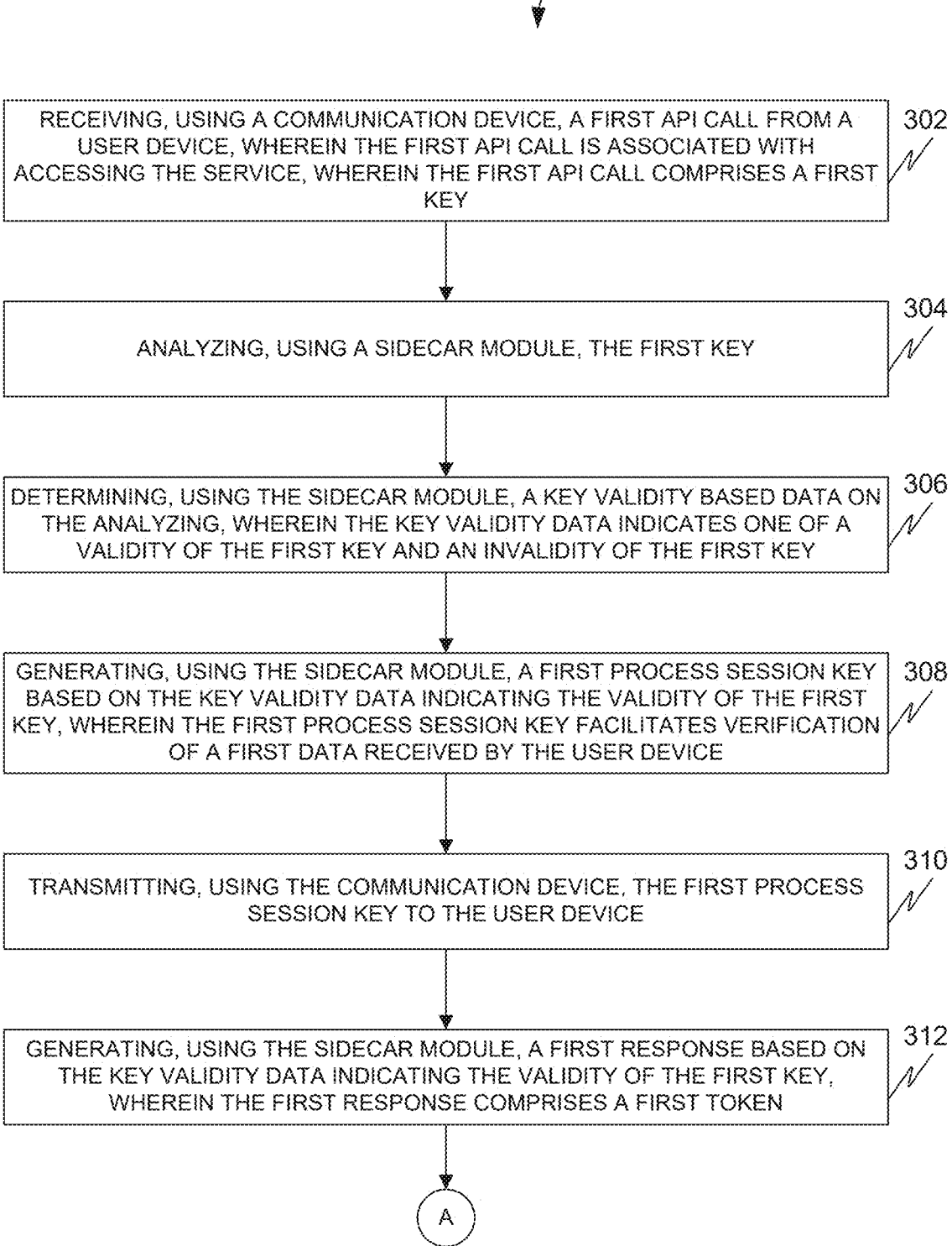

RECEIVING, USING A COMMUNICATION DEVICE, A FIRST API CALL FROM A USER DEVICE, WHEREIN THE FIRST API CALL IS ASSOCIATED WITH ACCESSING THE SERVICE, WHEREIN THE FIRST API CALL COMPRISES A FIRST KEY

ANALYZING, USING A SIDECAR MODULE, THE FIRST KEY

DETERMINING, USING THE SIDECAR MODULE, A KEY VALIDITY BASED DATA ON THE ANALYZING, WHEREIN THE KEY VALIDITY DATA INDICATES ONE OF A VALIDITY OF THE FIRST KEY AND AN INVALIDITY OF THE FIRST KEY

GENERATING, USING THE SIDECAR MODULE, A FIRST PROCESS SESSION KEY BASED ON THE KEY VALIDITY DATA INDICATING THE VALIDITY OF THE FIRST KEY, WHEREIN THE FIRST PROCESS SESSION KEY FACILITATES VERIFICATION OF A FIRST DATA RECEIVED BY THE USER DEVICE

TRANSMITTING, USING THE COMMUNICATION DEVICE, THE FIRST PROCESS SESSION KEY TO THE USER DEVICE

GENERATING, USING THE SIDECAR MODULE, A FIRST RESPONSE BASED ON THE KEY VALIDITY DATA INDICATING THE VALIDITY OF THE FIRST KEY, WHEREIN THE FIRST RESPONSE COMPRISES A FIRST TOKEN

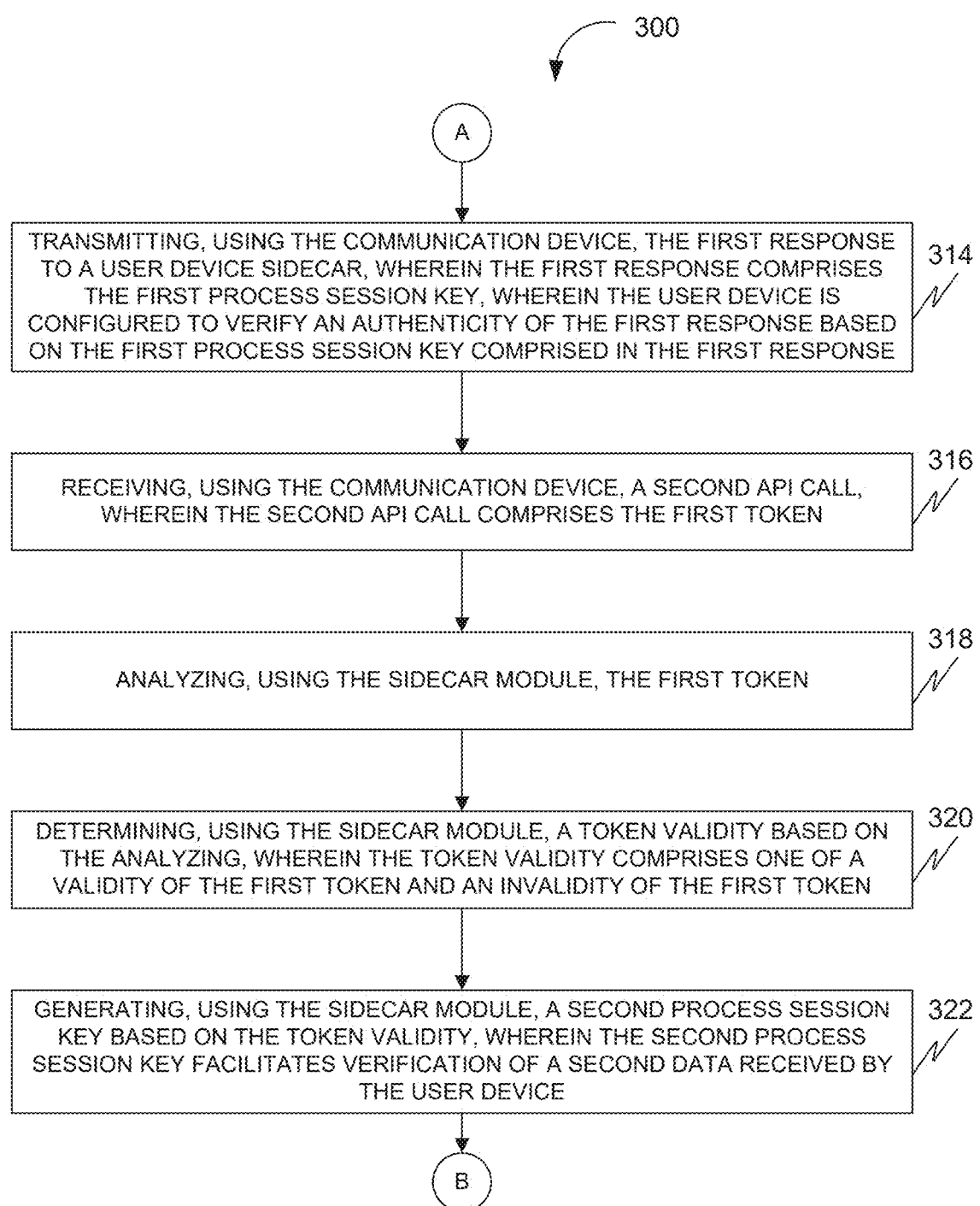

300

A

TRANSMITTING, USING THE COMMUNICATION DEVICE, THE FIRST RESPONSE TO A USER DEVICE SIDECAR, WHEREIN THE FIRST RESPONSE COMPRISES THE FIRST PROCESS SESSION KEY, WHEREIN THE USER DEVICE IS CONFIGURED TO VERIFY AN AUTHENTICITY OF THE FIRST RESPONSE BASED ON THE FIRST PROCESS SESSION KEY COMPRISED IN THE FIRST RESPONSE

314

RECEIVING, USING THE COMMUNICATION DEVICE, A SECOND API CALL, WHEREIN THE SECOND API CALL COMPRISES THE FIRST TOKEN

316

ANALYZING, USING THE SIDECAR MODULE, THE FIRST TOKEN

318

DETERMINING, USING THE SIDECAR MODULE, A TOKEN VALIDITY BASED ON THE ANALYZING, WHEREIN THE TOKEN VALIDITY COMPRISES ONE OF A VALIDITY OF THE FIRST TOKEN AND AN INVALIDITY OF THE FIRST TOKEN

320

GENERATING, USING THE SIDECAR MODULE, A SECOND PROCESS SESSION KEY BASED ON THE TOKEN VALIDITY, WHEREIN THE SECOND PROCESS SESSION KEY FACILITATES VERIFICATION OF A SECOND DATA RECEIVED BY THE USER DEVICE

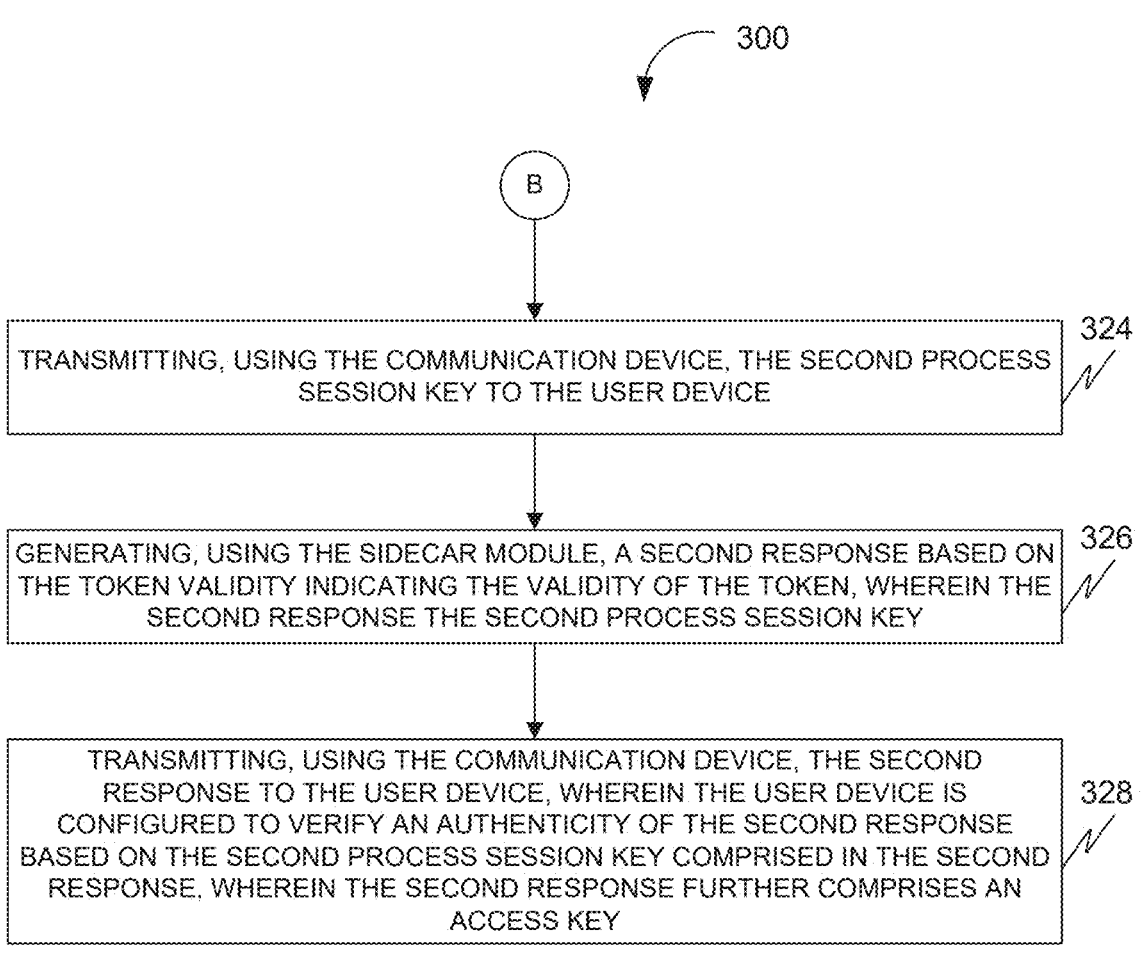

300

B

TRANSMITTING, USING THE COMMUNICATION DEVICE, THE SECOND PROCESS SESSION KEY TO THE USER DEVICE — 324

GENERATING, USING THE SIDECAR MODULE, A SECOND RESPONSE BASED ON THE TOKEN VALIDITY INDICATING THE VALIDITY OF THE TOKEN, WHEREIN THE SECOND RESPONSE THE SECOND PROCESS SESSION KEY — 326

TRANSMITTING, USING THE COMMUNICATION DEVICE, THE SECOND RESPONSE TO THE USER DEVICE, WHEREIN THE USER DEVICE IS CONFIGURED TO VERIFY AN AUTHENTICITY OF THE SECOND RESPONSE BASED ON THE SECOND PROCESS SESSION KEY COMPRISED IN THE SECOND RESPONSE, WHEREIN THE SECOND RESPONSE FURTHER COMPRISES AN ACCESS KEY — 328

| 402 |
| --- |

RECEIVING, USING THE COMMUNICATION DEVICE, AN AUTHENTICATION DATA FROM AN EXTERNAL SERVER BASED ON THE FIRST API CALL

404

ANALYZING, USING THE SIDECAR MODULE, THE AUTHENTICATION DATA, WHEREIN THE GENERATION OF THE KEY VALIDITY DATA IS FURTHER BASED ON THE ANALYZING

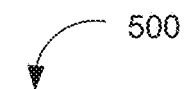

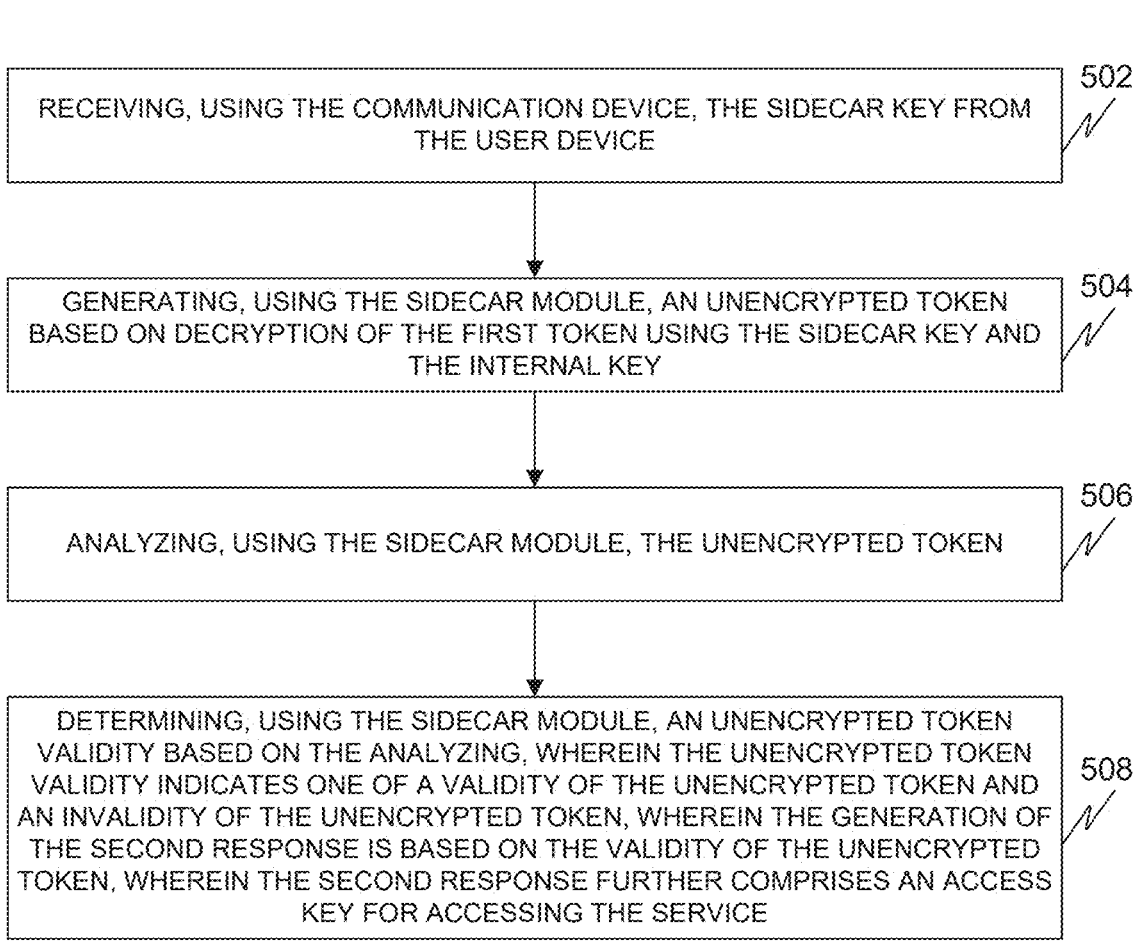

RECEIVING, USING THE COMMUNICATION DEVICE, THE SIDECAR KEY FROM THE USER DEVICE — 502

GENERATING, USING THE SIDECAR MODULE, AN UNENCRYPTED TOKEN BASED ON DECRYPTION OF THE FIRST TOKEN USING THE SIDECAR KEY AND THE INTERNAL KEY — 504

ANALYZING, USING THE SIDECAR MODULE, THE UNENCRYPTED TOKEN — 506

DETERMINING, USING THE SIDECAR MODULE, AN UNENCRYPTED TOKEN VALIDITY BASED ON THE ANALYZING, WHEREIN THE UNENCRYPTED TOKEN VALIDITY INDICATES ONE OF A VALIDITY OF THE UNENCRYPTED TOKEN AND AN INVALIDITY OF THE UNENCRYPTED TOKEN, WHEREIN THE GENERATION OF THE SECOND RESPONSE IS BASED ON THE VALIDITY OF THE UNENCRYPTED TOKEN, WHEREIN THE SECOND RESPONSE FURTHER COMPRISES AN ACCESS KEY FOR ACCESSING THE SERVICE — 508

Fig. 5

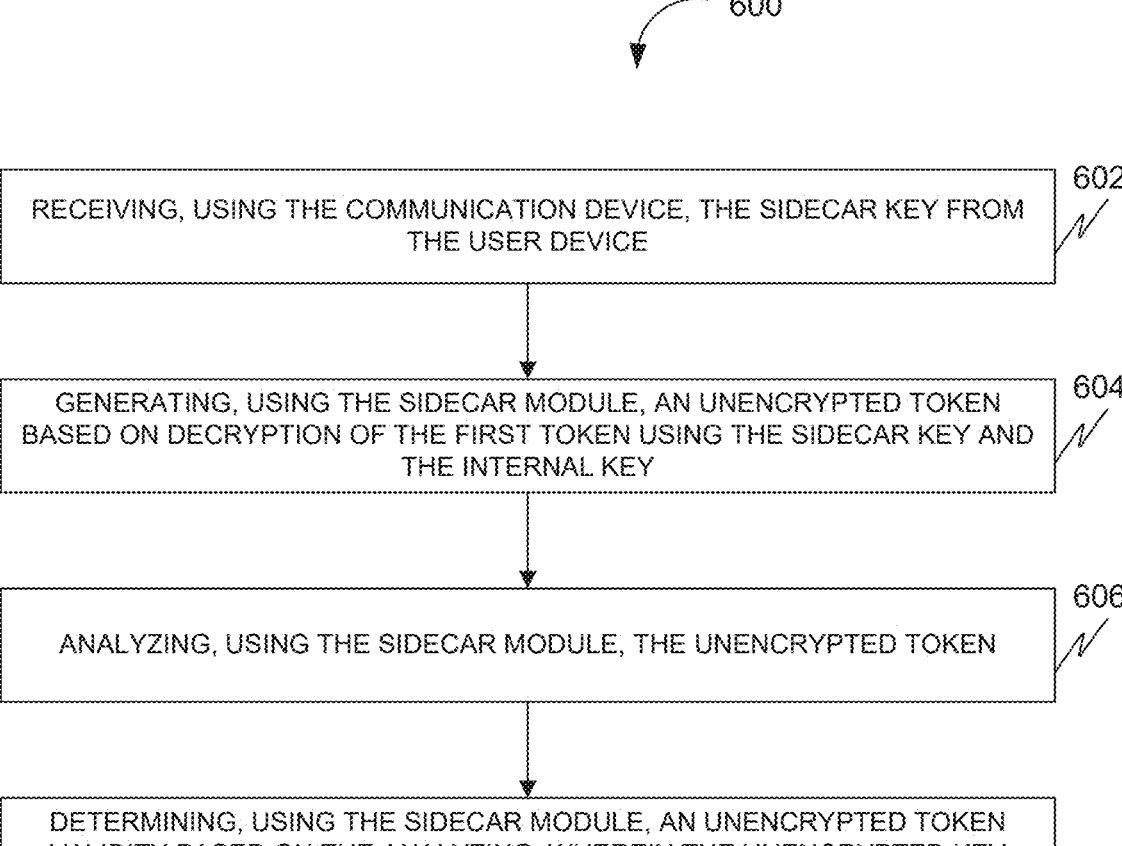

600

602

RECEIVING, USING THE COMMUNICATION DEVICE, THE SIDECAR KEY FROM THE USER DEVICE

604

GENERATING, USING THE SIDECAR MODULE, AN UNENCRYPTED TOKEN BASED ON DECRYPTION OF THE FIRST TOKEN USING THE SIDECAR KEY AND THE INTERNAL KEY

606

ANALYZING, USING THE SIDECAR MODULE, THE UNENCRYPTED TOKEN

608

DETERMINING, USING THE SIDECAR MODULE, AN UNENCRYPTED TOKEN VALIDITY BASED ON THE ANALYZING, WHEREIN THE UNENCRYPTED KEY VALIDITY INDICATES ONE OF A VALIDITY OF THE UNENCRYPTED TOKEN AND AN INVALIDITY OF THE UNENCRYPTED TOKEN, WHEREIN GENERATION OF THE SECOND RESPONSE IS BASED ON THE INVALIDITY OF THE UNENCRYPTED TOKEN, WHEREIN THE SECOND RESPONSE FURTHER COMPRISES A FAILED TOKEN RESPONSE

GENERATING, USING THE SIDECAR MODULE, A FIRST API RESPONSE BASED ON THE INVALIDITY OF THE FIRST KEY, WHEREIN THE FIRST API RESPONSE COMPRISES ONE OR MORE OF A FAILED RESPONSE CODE AND A DESCRIPTION

704

TRANSMITTING, USING THE COMMUNICATION DEVICE, THE FIRST API RESPONSE TO THE USER DEVICE

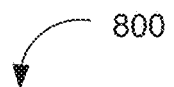

800

| | 802 |
|---|---|
| RECEIVING, USING A COMMUNICATION DEVICE, A FIRST API CALL FROM A USER DEVICE, WHEREIN THE FIRST API CALL IS ASSOCIATED WITH ACCESSING THE SERVICE, WHEREIN THE FIRST API CALL COMPRISES A FIRST KEY | |

| | 804 |
|---|---|
| RECEIVING, USING A COMMUNICATION DEVICE, AN AUTHENTICATION DATA FROM AN EXTERNAL SERVER BASED ON THE FIRST API CALL | |

| | 806 |
|---|---|
| ANALYZING, USING A SIDECAR MODULE, THE FIRST KEY AND THE AUTHENTICATION DATA | |

| | 808 |
|---|---|
| DETERMINING, USING THE SIDECAR MODULE, A KEY VALIDITY BASED DATA ON THE ANALYZING, WHEREIN THE KEY VALIDITY DATA INDICATES ONE OF A VALIDITY OF THE FIRST KEY AND AN INVALIDITY OF THE FIRST KEY | |

| | 810 |
|---|---|
| GENERATING, USING THE SIDECAR MODULE, A FIRST PROCESS SESSION KEY BASED ON THE KEY VALIDITY DATA INDICATING THE VALIDITY OF THE FIRST KEY, WHEREIN THE FIRST PROCESS SESSION KEY FACILITATES VERIFICATION OF A FIRST DATA RECEIVED BY THE USER DEVICE | |

| | 812 |
|---|---|
| TRANSMITTING, USING THE COMMUNICATION DEVICE, THE FIRST PROCESS SESSION KEY TO THE USER DEVICE | |

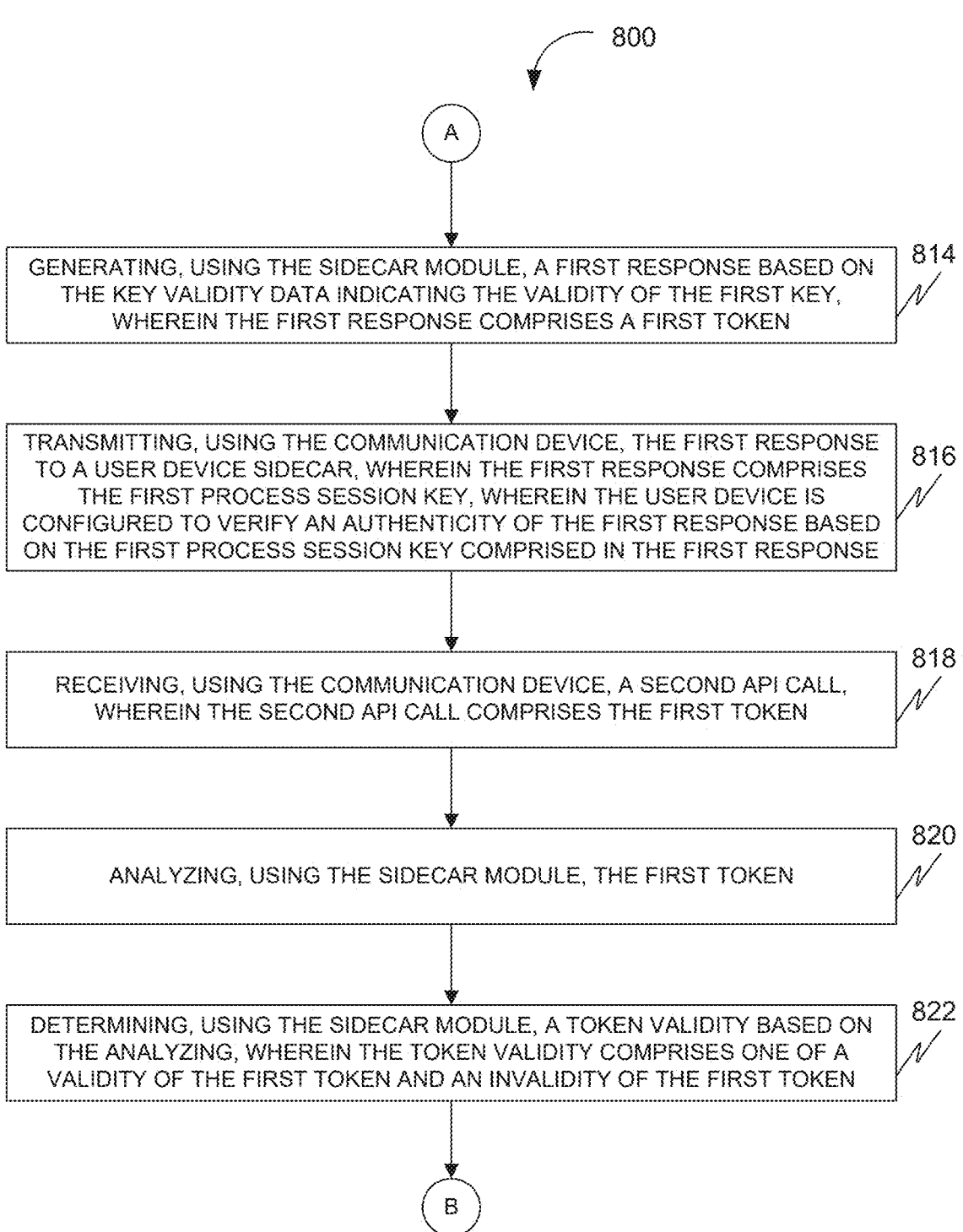

800

A

GENERATING, USING THE SIDECAR MODULE, A FIRST RESPONSE BASED ON THE KEY VALIDITY DATA INDICATING THE VALIDITY OF THE FIRST KEY, WHEREIN THE FIRST RESPONSE COMPRISES A FIRST TOKEN — 814

TRANSMITTING, USING THE COMMUNICATION DEVICE, THE FIRST RESPONSE TO A USER DEVICE SIDECAR, WHEREIN THE FIRST RESPONSE COMPRISES THE FIRST PROCESS SESSION KEY, WHEREIN THE USER DEVICE IS CONFIGURED TO VERIFY AN AUTHENTICITY OF THE FIRST RESPONSE BASED ON THE FIRST PROCESS SESSION KEY COMPRISED IN THE FIRST RESPONSE — 816

RECEIVING, USING THE COMMUNICATION DEVICE, A SECOND API CALL, WHEREIN THE SECOND API CALL COMPRISES THE FIRST TOKEN — 818

ANALYZING, USING THE SIDECAR MODULE, THE FIRST TOKEN — 820

DETERMINING, USING THE SIDECAR MODULE, A TOKEN VALIDITY BASED ON THE ANALYZING, WHEREIN THE TOKEN VALIDITY COMPRISES ONE OF A VALIDITY OF THE FIRST TOKEN AND AN INVALIDITY OF THE FIRST TOKEN — 822

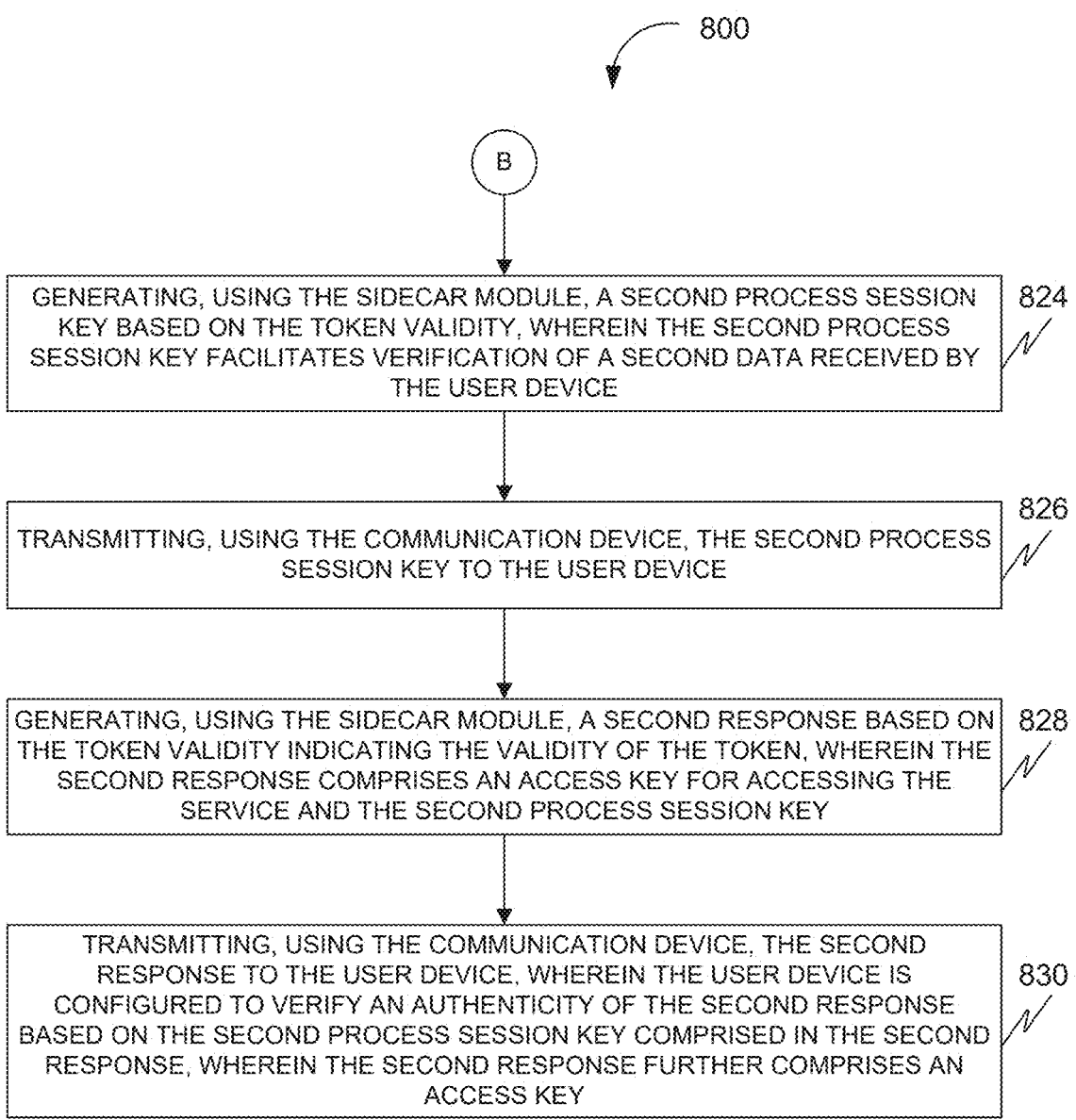

800

B

GENERATING, USING THE SIDECAR MODULE, A SECOND PROCESS SESSION KEY BASED ON THE TOKEN VALIDITY, WHEREIN THE SECOND PROCESS SESSION KEY FACILITATES VERIFICATION OF A SECOND DATA RECEIVED BY THE USER DEVICE — 824

TRANSMITTING, USING THE COMMUNICATION DEVICE, THE SECOND PROCESS SESSION KEY TO THE USER DEVICE — 826

GENERATING, USING THE SIDECAR MODULE, A SECOND RESPONSE BASED ON THE TOKEN VALIDITY INDICATING THE VALIDITY OF THE TOKEN, WHEREIN THE SECOND RESPONSE COMPRISES AN ACCESS KEY FOR ACCESSING THE SERVICE AND THE SECOND PROCESS SESSION KEY — 828

TRANSMITTING, USING THE COMMUNICATION DEVICE, THE SECOND RESPONSE TO THE USER DEVICE, WHEREIN THE USER DEVICE IS CONFIGURED TO VERIFY AN AUTHENTICITY OF THE SECOND RESPONSE BASED ON THE SECOND PROCESS SESSION KEY COMPRISED IN THE SECOND RESPONSE, WHEREIN THE SECOND RESPONSE FURTHER COMPRISES AN ACCESS KEY — 830

Fig. 8C

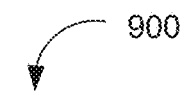

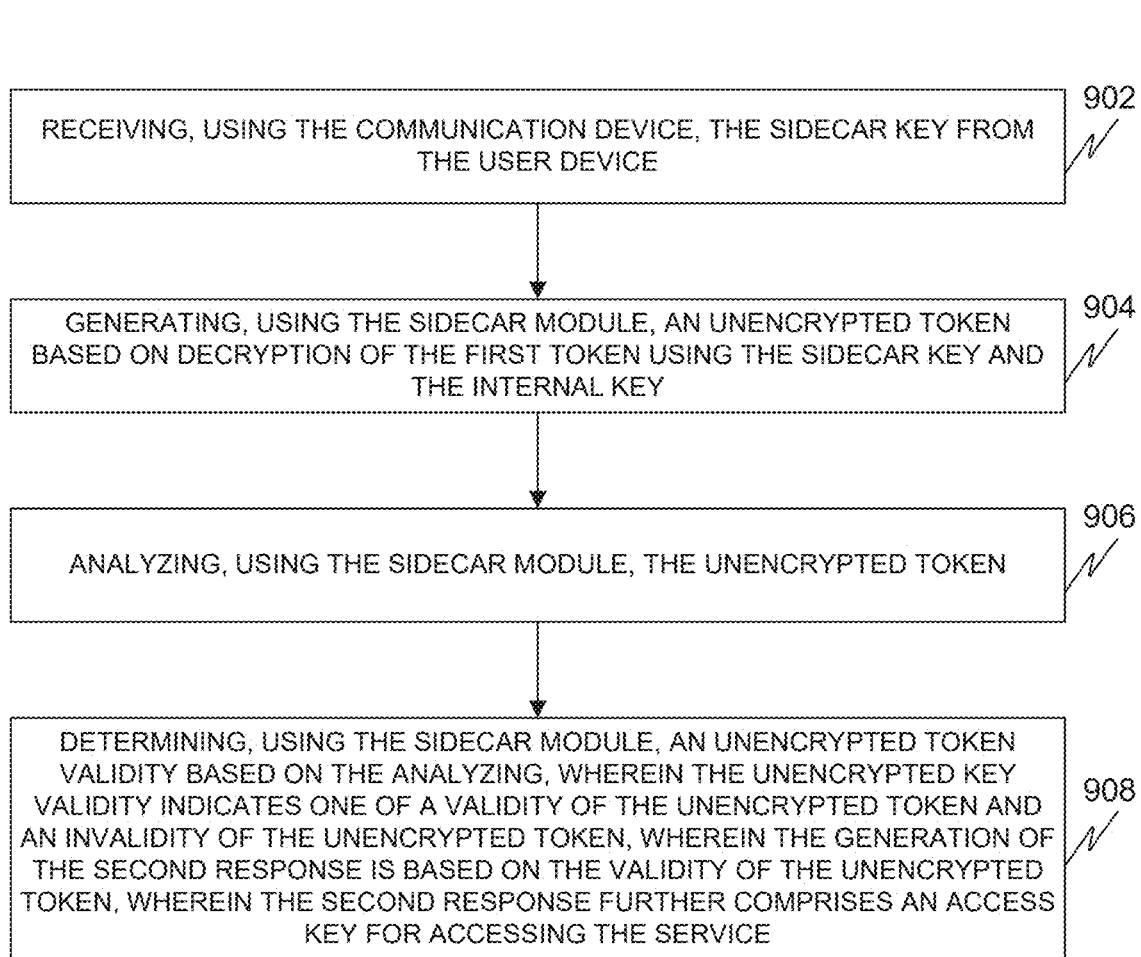

| RECEIVING, USING THE COMMUNICATION DEVICE, THE SIDECAR KEY FROM THE USER DEVICE | 902 |

| GENERATING, USING THE SIDECAR MODULE, AN UNENCRYPTED TOKEN BASED ON DECRYPTION OF THE FIRST TOKEN USING THE SIDECAR KEY AND THE INTERNAL KEY | 904 |

| ANALYZING, USING THE SIDECAR MODULE, THE UNENCRYPTED TOKEN | 906 |

| DETERMINING, USING THE SIDECAR MODULE, AN UNENCRYPTED TOKEN VALIDITY BASED ON THE ANALYZING, WHEREIN THE UNENCRYPTED KEY VALIDITY INDICATES ONE OF A VALIDITY OF THE UNENCRYPTED TOKEN AND AN INVALIDITY OF THE UNENCRYPTED TOKEN, WHEREIN THE GENERATION OF THE SECOND RESPONSE IS BASED ON THE VALIDITY OF THE UNENCRYPTED TOKEN, WHEREIN THE SECOND RESPONSE FURTHER COMPRISES AN ACCESS KEY FOR ACCESSING THE SERVICE | 908 |

Fig. 9

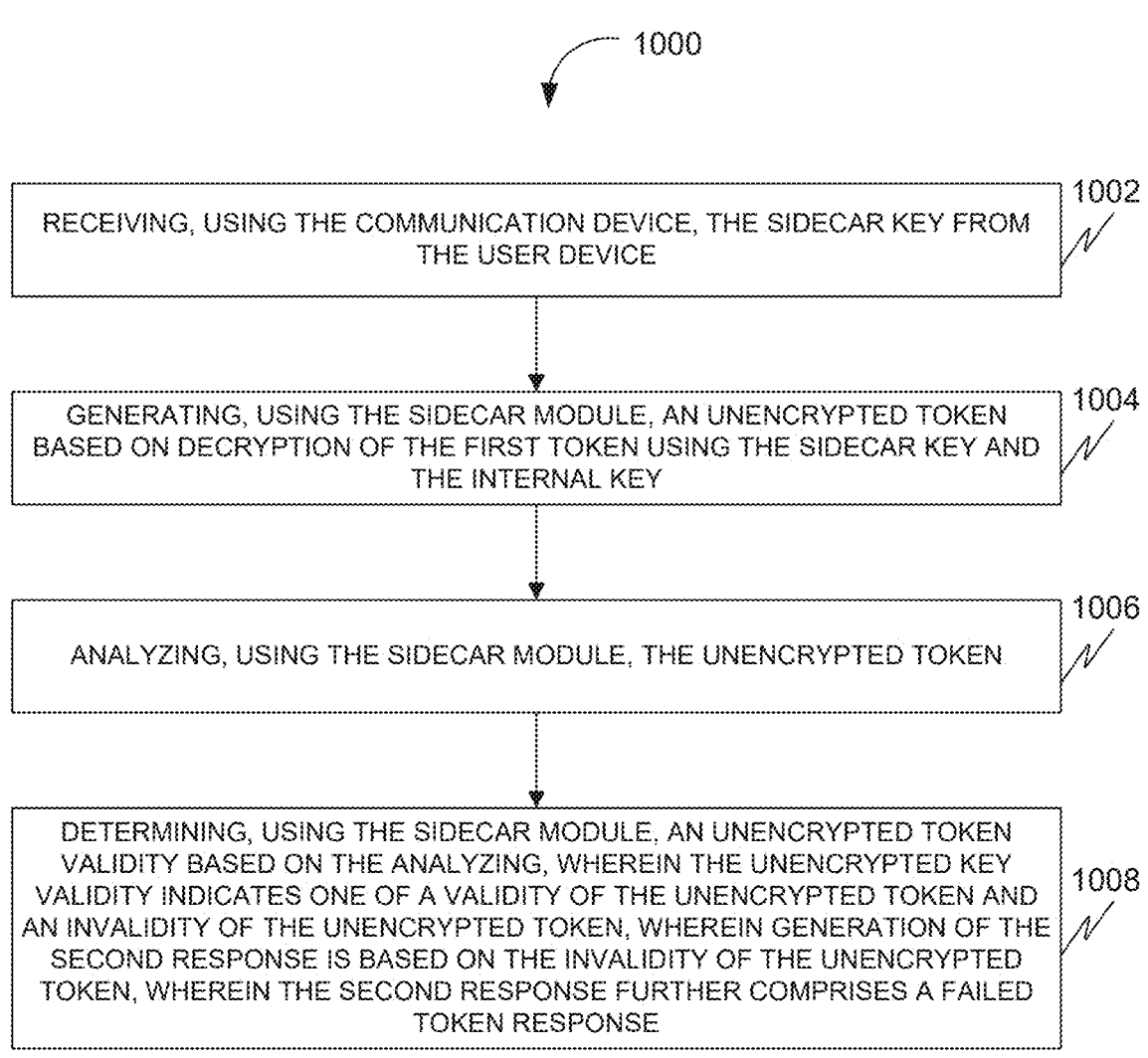

1000

RECEIVING, USING THE COMMUNICATION DEVICE, THE SIDECAR KEY FROM THE USER DEVICE    1002

GENERATING, USING THE SIDECAR MODULE, AN UNENCRYPTED TOKEN BASED ON DECRYPTION OF THE FIRST TOKEN USING THE SIDECAR KEY AND THE INTERNAL KEY    1004

ANALYZING, USING THE SIDECAR MODULE, THE UNENCRYPTED TOKEN    1006

DETERMINING, USING THE SIDECAR MODULE, AN UNENCRYPTED TOKEN VALIDITY BASED ON THE ANALYZING, WHEREIN THE UNENCRYPTED KEY VALIDITY INDICATES ONE OF A VALIDITY OF THE UNENCRYPTED TOKEN AND AN INVALIDITY OF THE UNENCRYPTED TOKEN, WHEREIN GENERATION OF THE SECOND RESPONSE IS BASED ON THE INVALIDITY OF THE UNENCRYPTED TOKEN, WHEREIN THE SECOND RESPONSE FURTHER COMPRISES A FAILED TOKEN RESPONSE    1008

Fig. 10

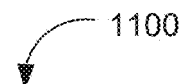
1100

```
┌─────────────────────────────────────────────────────────────────┐  1102
│ GENERATING, USING THE SIDECAR MODULE, A FIRST API RESPONSE BASED  │  ⤢
│ ON THE INVALIDITY OF THE FIRST KEY, WHEREIN THE FIRST API RESPONSE│
│ COMPRISES ONE OR MORE OF A FAILED RESPONSE CODE AND A             │
│ DESCRIPTION                                                       │
└─────────────────────────────────────────────────────────────────┘
                                │
                                ▼
┌─────────────────────────────────────────────────────────────────┐  1104
│ TRANSMITTING, USING THE COMMUNICATION DEVICE, THE FIRST API       │  ⤢
│ RESPONSE TO THE USER DEVICE                                       │
└─────────────────────────────────────────────────────────────────┘
```

COMMUNICATION
DEVICE

SIDECAR MODULE

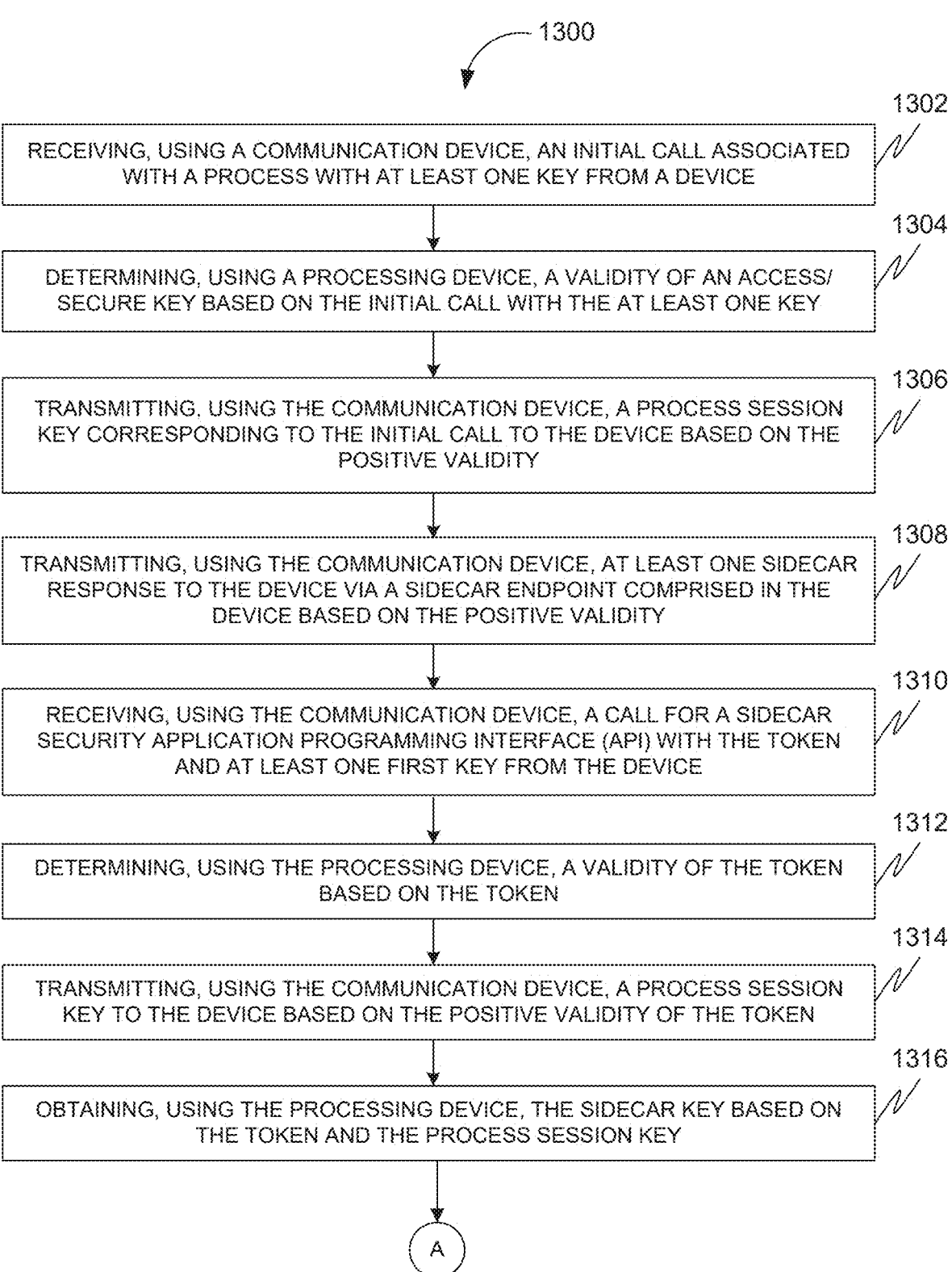

1300

1302
RECEIVING, USING A COMMUNICATION DEVICE, AN INITIAL CALL ASSOCIATED WITH A PROCESS WITH AT LEAST ONE KEY FROM A DEVICE

1304
DETERMINING, USING A PROCESSING DEVICE, A VALIDITY OF AN ACCESS/ SECURE KEY BASED ON THE INITIAL CALL WITH THE AT LEAST ONE KEY

1306
TRANSMITTING, USING THE COMMUNICATION DEVICE, A PROCESS SESSION KEY CORRESPONDING TO THE INITIAL CALL TO THE DEVICE BASED ON THE POSITIVE VALIDITY

1308
TRANSMITTING, USING THE COMMUNICATION DEVICE, AT LEAST ONE SIDECAR RESPONSE TO THE DEVICE VIA A SIDECAR ENDPOINT COMPRISED IN THE DEVICE BASED ON THE POSITIVE VALIDITY

1310
RECEIVING, USING THE COMMUNICATION DEVICE, A CALL FOR A SIDECAR SECURITY APPLICATION PROGRAMMING INTERFACE (API) WITH THE TOKEN AND AT LEAST ONE FIRST KEY FROM THE DEVICE

1312
DETERMINING, USING THE PROCESSING DEVICE, A VALIDITY OF THE TOKEN BASED ON THE TOKEN

1314
TRANSMITTING, USING THE COMMUNICATION DEVICE, A PROCESS SESSION KEY TO THE DEVICE BASED ON THE POSITIVE VALIDITY OF THE TOKEN

1316
OBTAINING, USING THE PROCESSING DEVICE, THE SIDECAR KEY BASED ON THE TOKEN AND THE PROCESS SESSION KEY

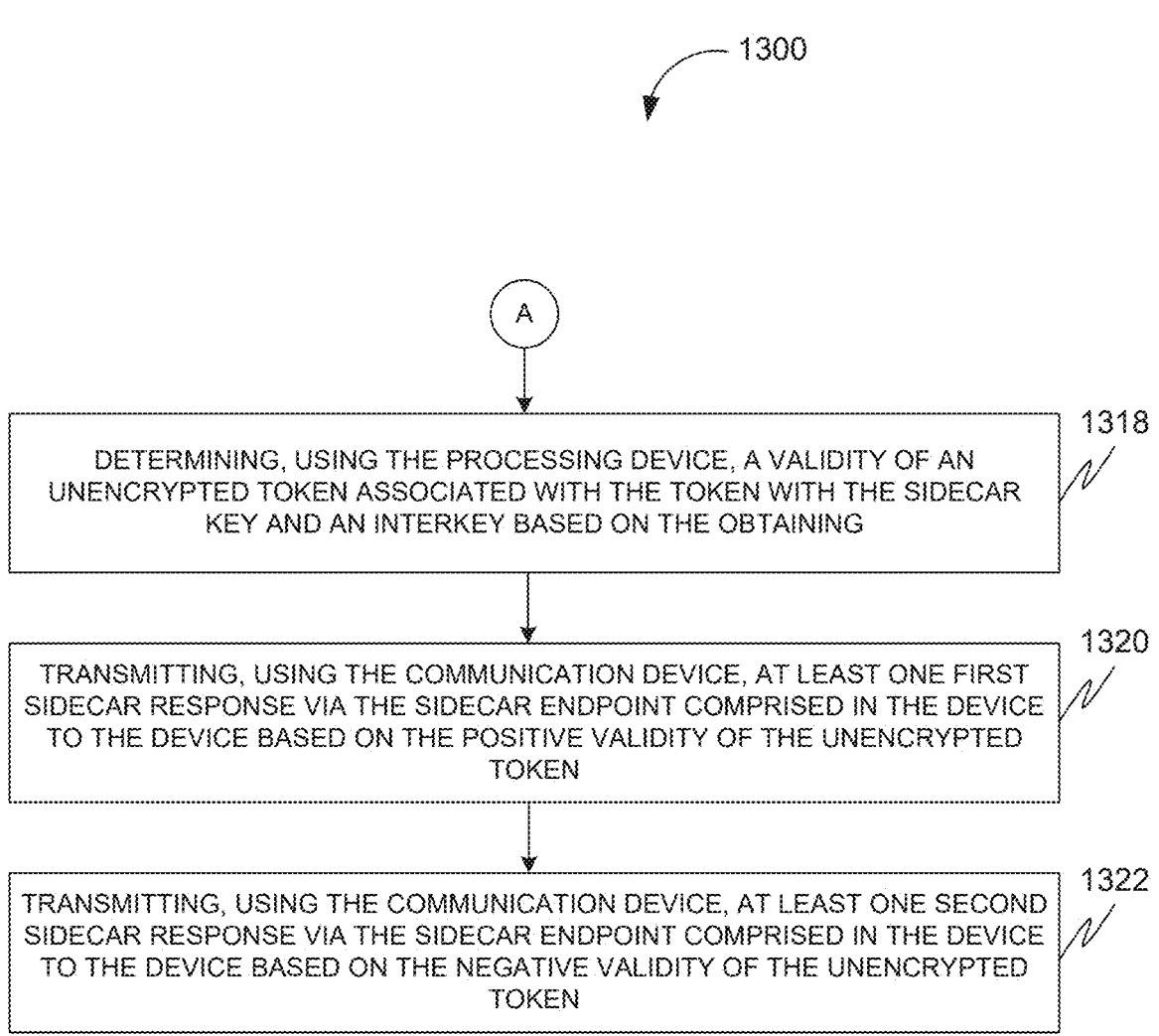

1300

A

DETERMINING, USING THE PROCESSING DEVICE, A VALIDITY OF AN UNENCRYPTED TOKEN ASSOCIATED WITH THE TOKEN WITH THE SIDECAR KEY AND AN INTERKEY BASED ON THE OBTAINING    1318

TRANSMITTING, USING THE COMMUNICATION DEVICE, AT LEAST ONE FIRST SIDECAR RESPONSE VIA THE SIDECAR ENDPOINT COMPRISED IN THE DEVICE TO THE DEVICE BASED ON THE POSITIVE VALIDITY OF THE UNENCRYPTED TOKEN    1320

TRANSMITTING, USING THE COMMUNICATION DEVICE, AT LEAST ONE SECOND SIDECAR RESPONSE VIA THE SIDECAR ENDPOINT COMPRISED IN THE DEVICE TO THE DEVICE BASED ON THE NEGATIVE VALIDITY OF THE UNENCRYPTED TOKEN    1322

COMMUNICATION DEVICE

PROCESSING DEVICE

METHODS AND SYSTEMS OF FACILITATING AUTHENTICATION FOR ACCESSING A SERVICE

FIELD OF DISCLOSURE

Generally, the present disclosure relates to the field of data processing. More specifically, the present disclosure relates to methods and systems for facilitating authentication for accessing a service.

BACKGROUND

Existing techniques for authenticating requests for a service are deficient in several regards. In most solutions, a service module provisioning a service is also configured to implement an authentication workflow. This leads to complications in both developing and maintaining service modules. Further, some solutions have been developed where the authentication workflow has been compartmentalized in a separate module different from the service module. However, in these solutions, there is an increased risk of unauthorized access due to malicious attacks.

Therefore, there is a need for improved methods and systems for facilitating authentication for accessing a service that may overcome one or more of the above-mentioned problems and/or limitations.

SUMMARY OF DISCLOSURE

This summary is provided to introduce a selection of concepts in a simplified form that are further described below in the Detailed Description. This summary is not intended to identify key features or essential features of the claimed subject matter. Nor is this summary intended to be used to limit the claimed subject matter's scope.

The present disclosure provides a method of facilitating authentication for accessing a service. Further, the method may include receiving, using a communication device, a first API call from a user device. Further, the first API call may be associated with accessing the service. Further, the first API call includes a first key. Further, the method may include analyzing, using a sidecar module, the first key. Further, the method may include determining, using the sidecar module, a key validity based data on the analyzing. Further, the key validity data indicates one of a validity of the first key and an invalidity of the first key. Further, the method may include generating, using the sidecar module, a first process session key based on the key validity data indicating the validity of the first key. Further, the first process session key facilitates verification of a first data received by the user device. Further, the method may include transmitting, using the communication device, the first process session key to the user device. Further, the method may include generating, using the sidecar module, a first response based on the key validity data indicating the validity of the first key. Further, the first response includes a first token. Further, the method may include transmitting, using the communication device, the first response to a user device sidecar. Further, the first response includes the first process session key. Further, the user device may be configured to verify an authenticity of the first response based on the first process session key comprised in the first response. Further, the method may include receiving, using the communication device, a second API call. Further, the second API call includes the first token. Further, the method may include analyzing, using the sidecar module, the first token. Further, the method may include determining, using the sidecar module, a token validity based on the analyzing. Further, the token validity includes one of a validity of the first token and an invalidity of the first token. Further, the method may include generating, using the sidecar module, a second process session key based on the token validity indicating the validity of the first token. Further, the second process session key facilitates verification of a second data received by the user device. Further, the method may include transmitting, using the communication device, the second process session key to the user device. Further, the method may include generating, using the sidecar module, a second response based on the token validity indicating the validity of the first token. Further, the second response may include the second process session key. Further, the method may include transmitting, using the communication device, the second response to the user device. Further, the user device may be configured to verify an authenticity of the second response based on the second process session key comprised in the second response.

The present disclosure provides a method of facilitating authentication for accessing a service. Further, the method may include receiving, using a communication device, a first API call from a user device. Further, the first API call may be associated with accessing the service. Further, the first API call includes a first key. Further, the method may include receiving, using a communication device, an authentication data from an external server based on the first API call. Further, the method may include analyzing, using a sidecar module, the first key, and the authentication data. Further, the method may include determining, using the sidecar module, a key validity based data on the analyzing. Further, the key validity data indicates one of a validity of the first key and an invalidity of the first key. Further, the method may include generating, using the sidecar module, a first process session key based on the key validity data indicating the validity of the first key. Further, the first process session key facilitates verification of a first data received by the user device. Further, the method may include transmitting, using the communication device, the first process session key to the user device. Further, the method may include generating, using the sidecar module, a first response based on the key validity data indicating the validity of the first key. Further, the first response includes a first token. Further, the method may include transmitting, using the communication device, the first response to a user device sidecar. Further, the first response includes the first process session key. Further, the user device may be configured to verify an authenticity of the first response based on the first process session key comprised in the first response. Further, the method may include receiving, using the communication device, a second API call. Further, the second API call includes the first token. Further, the method may include analyzing, using the sidecar module, the first token. Further, the method may include determining, using the sidecar module, a token validity based on the analyzing. Further, the token validity includes one of a validity of the first token and an invalidity of the first token. Further, the method may include generating, using the sidecar module, a second process session key based on the token validity indicating the validity of the first token. Further, the second process session key facilitates verification of a second data received by the user device. Further, the method may include transmitting, using the communication device, the second process session key to the user device. Further, the method may include generating, using the sidecar module, a second response based on the token validity indicating the validity of the first token. Further, the second response includes the second process session key. Further, the method may include transmitting, using the communication device, the second response to the user device. Further, the user device may be configured to verify an authenticity of the second response based on the second process session key comprised in the second response.

The present disclosure provides a system for facilitating authentication for accessing a service. Further, the system may include a communication device. Further, the communication device may be configured to receive a first API call from a user device. Further, the first API call may be associated with accessing the service. Further, the first API call includes a first key. Further, the communication device may be configured to transmit a first process session key to the user device. Further, the communication device may be configured to transmit a first response to a user device sidecar. Further, the first response includes the first process session key. Further, the user device may be configured to verify an authenticity of the first response based on the first process session key comprised in the first response. Further, the communication device may be configured to receive a second API call. Further, the second API call includes the first token. Further, the communication device may be configured to transmit a second process session key to the user device. Further, the communication device may be configured to transmit a second response to the user device sidecar. Further, the user device may be configured to verify an authenticity of the second response based on the second process session key comprised in the second response. Further, the system may include a sidecar module communicatively coupled with the communication device. Further, the sidecar module may be configured to analyze the first key. Further, the sidecar module may be configured to determine a key validity based data on the analyzing. Further, the key validity data indicates one of a validity of the first key and an invalidity of the first key. Further, the sidecar module may be configured to generate the first process session key based on the key validity data indicating the validity of the first key. Further, the sidecar module may be configured to generate the first response based on the key validity data indicating the validity of the first key. Further, the first response includes a first token. Further, the sidecar module may be configured to analyze the first token. Further, the sidecar module may be configured to determine a token validity based on the analyzing. Further, the token validity indicates one of a validity of the first token and an invalidity of the first token. Further, the sidecar module may be configured to generate the second process session key based on the token validity indicating the validity of the first token. Further, the sidecar module may be configured to generate the second response based on the token validity indicating validity of the first token. Further, the second response includes the second process session key.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTIONS OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 3A illustrates a flowchart of a method 300 of facilitating authentication for accessing a service, in accordance with some embodiments.

FIG. 3B illustrates a continuation of the flowchart of the method 300 of facilitating authentication for accessing a service, in accordance with some embodiments.

FIG. 3C illustrates a continuation of the flowchart of the method 300 of facilitating authentication for accessing a service, in accordance with some embodiments.

FIG. 5 illustrates a flowchart of a method 500 of facilitating authentication for accessing a service including determining, using the sidecar module 1204, an unencrypted token validity, in accordance with some embodiments.

FIG. 6 illustrates a flowchart of a method 600 of facilitating authentication for accessing a service including determining, using the sidecar module 1204, an unencrypted token validity, in accordance with some embodiments.

FIG. 8A illustrates a flowchart of a method 800 of facilitating authentication for accessing a service, in accordance with some embodiments.

FIG. 8B illustrates a continuation of the flowchart of the method 800 of facilitating authentication for accessing a service, in accordance with some embodiments.

FIG. 8C illustrates a continuation of the flowchart of the method 800 of facilitating authentication for accessing a service, in accordance with some embodiments.

FIG. 9 illustrates a flowchart of a method 900 of facilitating authentication for accessing a service including determining, using the sidecar module 1204, an unencrypted token validity, in accordance with some embodiments.

FIG. 10 illustrates a flowchart of a method 1000 of facilitating authentication for accessing a service including determining, using the sidecar module 1204, an unencrypted token validity, in accordance with some embodiments.

FIG. 11 illustrates a flowchart of a method 1100 of facilitating authentication for accessing a service including generating, using the sidecar module 1204, a first API response, in accordance with some embodiments.

FIG. 13A is a flowchart of a method 1300 for verifying processes with sidecar technology, in accordance with some embodiments.

FIG. 13B is a continuation of a flowchart of a method 1300 for verifying processes with sidecar technology, in accordance with some embodiments.

DETAILED DESCRIPTION OF DISCLOSURE

Figure 1:
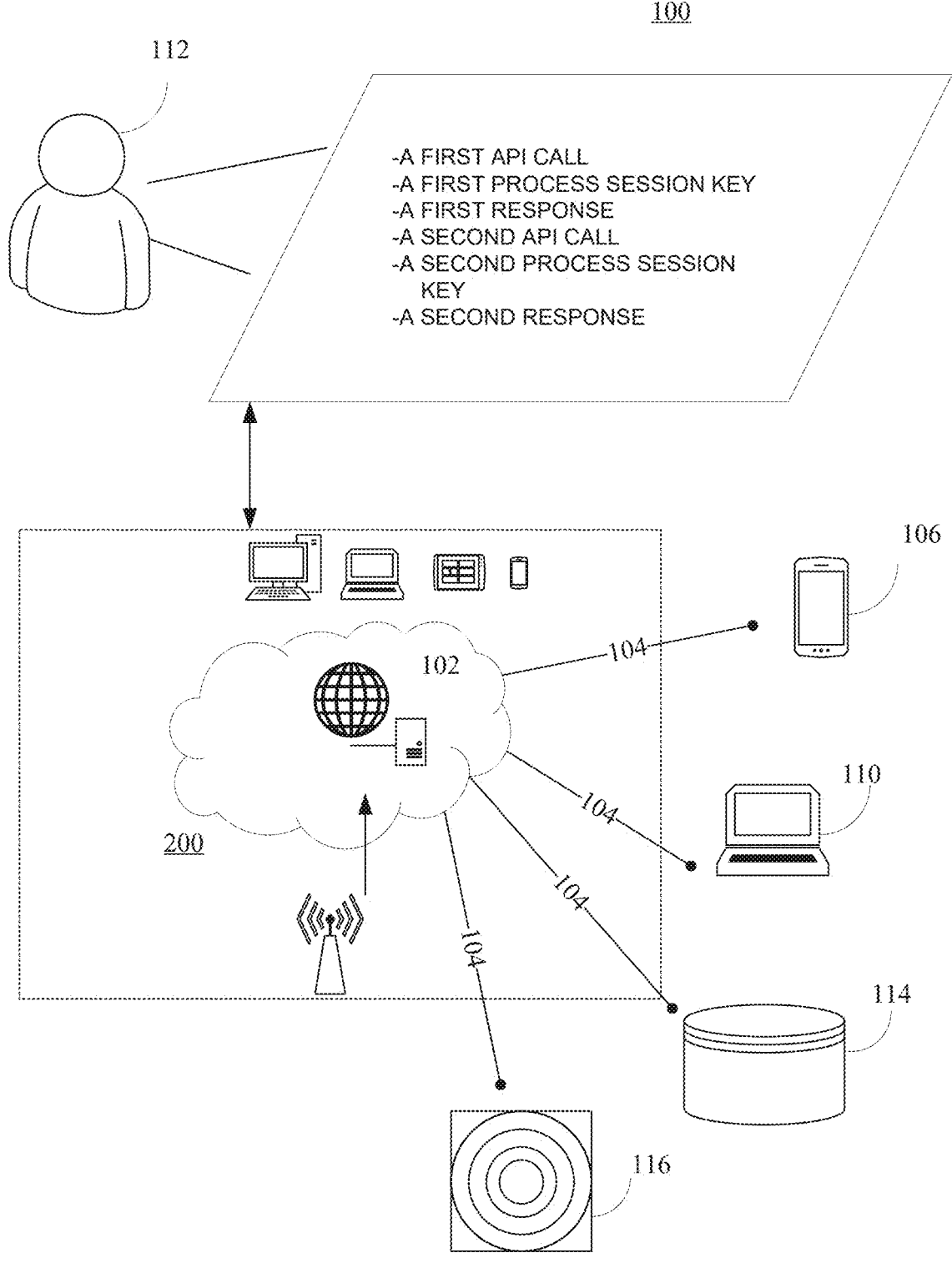
FIG. 1 is an illustration of an online platform 100 consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure.

Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of the disclosed use cases, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled, and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal, or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer, etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera, and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data, and any intermediate data there between corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure describes systems and methods for verifying processes with sidecar technology.

Further, the present disclosure describes a method to verify processes with sidecar technology from application programming interface (API) consumers requesting security tokens.

Further, the method may include step 1, which includes an Initial Call Process with an API Key, API Secure Key, Connection Key, Group Key, and Token Duration Key and returns a Process Session Key. Further, the Process Session Key is a Unique Identifier to compare with a SideCar Response. The Consumer may create a sidecar endpoint that uses the Process Session Key as its access key to receive.

Further, the method may include step 1a which may be associated with an Encrypted Token, which is created with two Encryption Keys. One key stays at the process end associated with the process other is sent via SideCar call. Further, a SideCar Response API Endpoint at the Consumer receives SideCar Responses with Process Session Key as the Authorization key to compare against the Process Session Key of the Initial Call Process. Further, the SideCar Response may include SideCar Response 1, which is a secure time-limited unique Token for Authorization of APIs (Token). Further, the SideCar Response may include Sidecar Response 2, which includes SideCar Key for Secure Token.

Further, the method may include step 2, which may be associated with the authorization of the timed token. Further, step 2 may include the Consumer API that uses the Token for its Authorization for the consumers that call its APIs. As the Consumer receives calls to its API with the Token the Consumer Calls the SideCar Security API with the Token, Connect Key, Route Key, and Group Key. And Returns a Process Session Key. Further, the Process Session Key may be used to Uniquely Identify to compare with SideCar Response.

Further, the method may include step 2a. Further, in step 2a SideCar Response API Endpoint at the Consumer, which receives SideCar Responses with Process Session Key as the Authorization key, compares the Authorization key against the Process Session Key of the Initial Call Process. Further, the SideCar Responses may include SideCar Response 1, which includes sending Token/Process Session Key for SideCar Key Response. Further, the SideCar Responses may include SideCar Response 2, which includes sending Process Session Key with Access Keys. Further, the SideCar Responses may include SideCar Response 2a which includes sending Process Session Key with a Failed Token.

FIGS. 13A and 13B is a flowchart of a method 1300 for verifying processes with sidecar technology, in accordance with some embodiments.

Accordingly, the method 1300 may include a step 1302 of receiving, using a communication device 1402, a call associated with a process with at least one key from a device. Further, the call may be an initial call. Further, the process may include an initial call process. Further, the at least one key may include API Key, API Secure Key, Connection Key, Group Key, and Token Duration Key. Further, the device may include a client device. Further, the device may include a Consumer Connect 1502 and a Consumer SideCar 1510.

Further, the method 1300 may include a step 1304 of determining, using a processing device 1404, a validity of an access/secure key based on the at least one key. Further, the validity may include a positive validity and a negative validity.

Further, the method 1300 may include a step 1306 of transmitting, using the communication device 1402, a process session key corresponding to the call to the device based on the positive validity. Further, the transmitting of the process session key may include transmitting the process session key to the device at the Consumer Connect 1502 of the device.

Further, the method 1300 may include a step 1308 of transmitting, using the communication device 1402, at least one sidecar response to the device based on the positive validity. Further, a sidecar endpoint that may be comprised in the device receives the at least one sidecar response. Further, the at least one sidecar response may include a first sidecar response comprising a process session key and a token and a second sidecar response comprising a process session key and a sidecar key. Further, the token may include a secure time-limited unique token. Further, the token may be an encrypted token, which may be created with two encryption keys. Further, the transmitting of the at least one sidecar response may include transmitting the at least one sidecar to the Consumer SideCar 1510 of the device.

Further, the method 1300 may include a step 1310 of receiving, using the communication device 1402, a call for a sidecar security application programming interface (API) with the token and at least one first key from the device. Further, the at least one first key may include Connect Key, Route Key, and Group Key. Further, the device may be associated with a consumer token owner.

Further, the method 1300 may include a step 1312 of determining, using the processing device 1404, a validity of the token based on the token. Further, the validity of the token may include a positive validity of the token and a negative validity of the token.

Further, the method 1300 may include a step 1314 of transmitting, using the communication device 1402, a process session key to the device based on the positive validity of the token. Further, the transmitting of the process session key may include transmitting the process session key to the Consumer Connect 1502 of the device.

Further, the method 1300 may include a step 1316 of obtaining, using the processing device 1404, the sidecar key based on the token and the process session key.

Further, the method 1300 may include a step 1318 of determining, using the processing device 1404, a validity of an unencrypted token associated with the token with the sidecar key and an inter key based on the obtaining. Further, the validity of the unencrypted token may include a positive validity of the unencrypted token and a negative validity of the unencrypted token.

Further, the method 1300 may include a step 1320 of transmitting, using the communication device 1402, at least one first sidecar response to the device based on the positive validity of the unencrypted token. Further, the sidecar endpoint that may be comprised in the device receives the at least one first sidecar response. Further, the at least one first sidecar response may include a process session key and an access key. Further, the transmitting of the at least one first sidecar response may include transmitting the at least one first sidecar response to the device at the Consumer SideCar 1510 of the device.

Further, in some embodiments, the method 1300 may include a step 1322 of transmitting, using the communication device 1402, at least one second sidecar response to the device based on the negative validity of the unencrypted token. Further, the sidecar endpoint that may be comprised in the device receives the at least one second sidecar response. Further, the at least one second sidecar response may include a process session key and an invalid token. Further, the transmitting of the at least one second sidecar response may include transmitting the at least one second sidecar response to the Consumer SideCar 1510 of the device.

Figure 14:
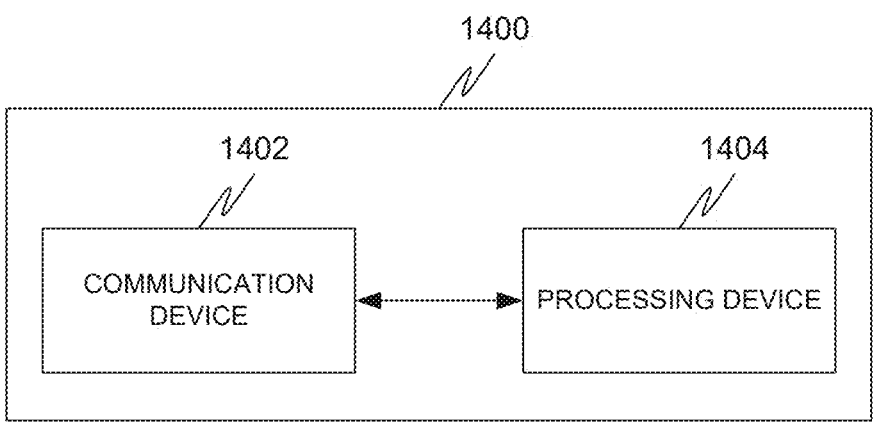
FIG. 14 is a block diagram of a system 1400 for verifying processes with sidecar technology, in accordance with some embodiments.

FIG. 14 is a block diagram of a system for verifying processes with sidecar technology, in accordance with some embodiments. Accordingly, the system may include a communication device 1402 and a processing device 1404.

Further, the communication device 1402 may be configured for receiving a call associated with a process with at least one key from a device. Further, the communication device 1402 may be configured for transmitting a process session key corresponding to the call to the device based on a positive validity. Further, the communication device 1402 may be configured for transmitting at least one sidecar response to the device based on the positive validity. Further, the at least one sidecar response may include a first sidecar response comprising a process session key and a token and a second sidecar response comprising a process session key and a sidecar key. Further, the communication device 1402 may be configured for receiving a call for a sidecar security application programming interface (API) with the token and at least one first key from the device. Further, the communication device 1402 may be configured for transmitting a process session key to the device based on a positive validity of the token. Further, the communication device 1402 may be configured for transmitting at least one first sidecar response to the device based on the positive validity of an unencrypted token. Further, the at least one first sidecar response may include a process session key and an access key. Further, in some embodiments, the communication device 1402 may be configured for transmitting at least one second sidecar response to the device based on a negative validity of the unencrypted token. Further, the at least one second sidecar response may include a process session key and an invalid token.

Further, the processing device 1404 may be communicatively coupled with the communication device 1402. Further, the processing device 1404 may be configured for determining a validity of the access/secure key based on the at least one key. Further, the validity may include the positive validity and a negative validity. Further, the processing device 1404 may be configured for determining a validity of the token based on the token. Further, the validity of the token may include the positive validity of the token and a negative validity of the token. Further, the processing device 1404 may be configured for obtaining the sidecar key based on the token and the process session key. Further, the processing device 1404 may be configured for determining a validity of the unencrypted token associated with the token with the sidecar key and an inter key based on the obtaining. Further, the validity of the unencrypted token may include the positive validity of the unencrypted token and the negative validity of the unencrypted token.

Figure 15:
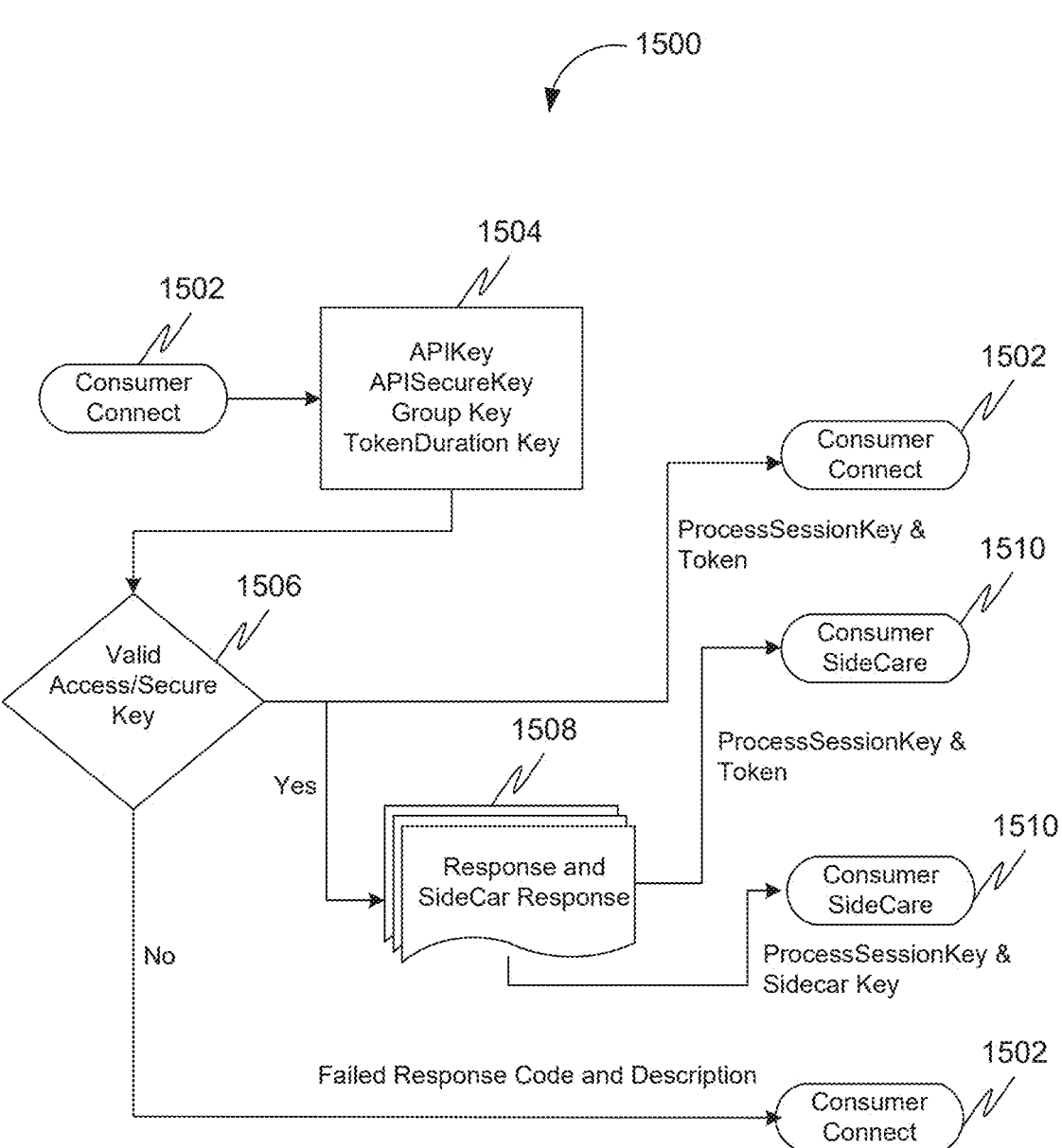
FIG. 15 is a flow diagram of a method 1500 to verify processes with sidecar technology from application programming interface (API) consumers requesting security tokens, in accordance with some embodiments.
Figure 16:
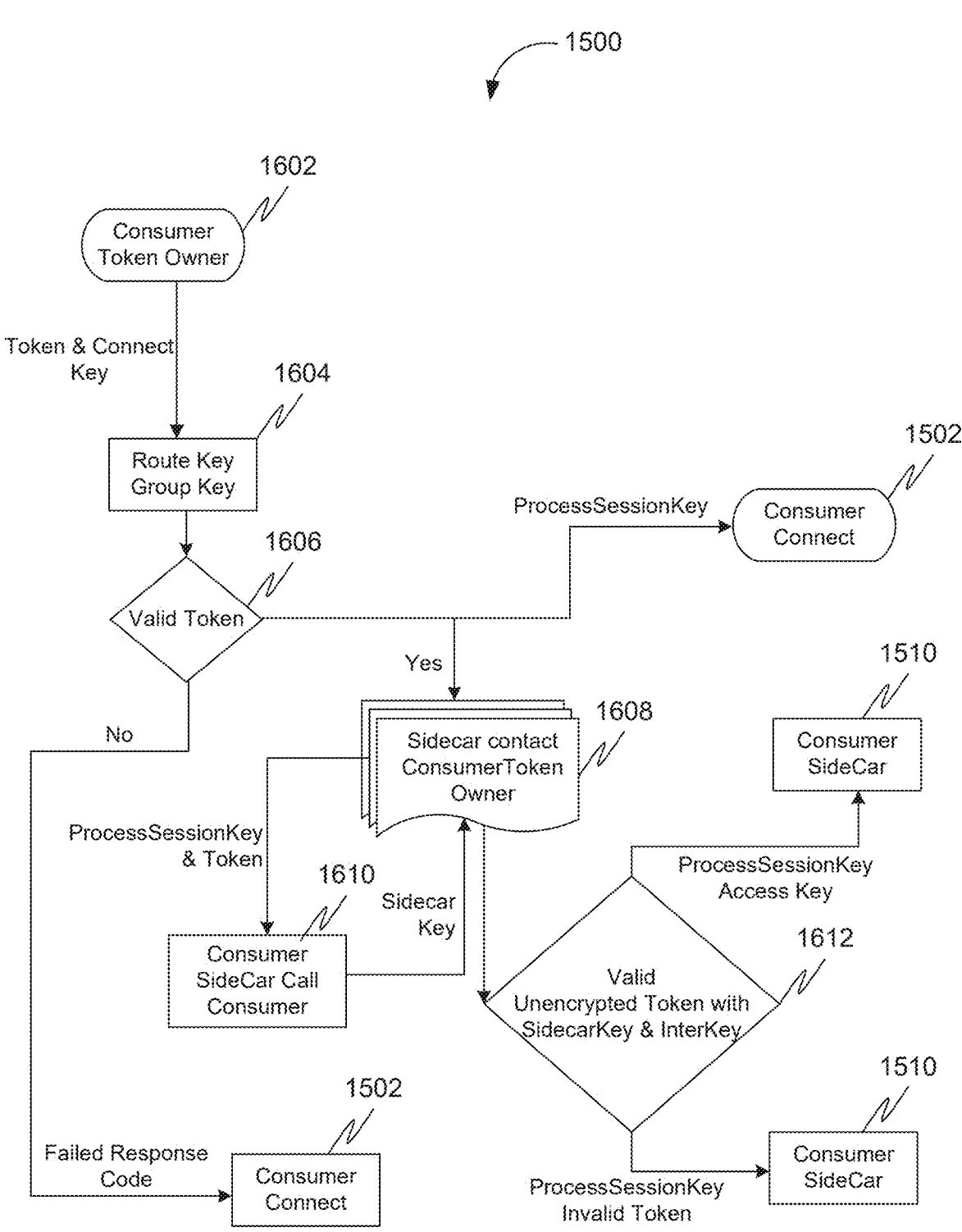
FIG. 16 is a continuation flow diagram of the method 1500 to verify the processes with the sidecar technology from the application programming interface (API) consumers requesting the security tokens, in accordance with some embodiments.

FIG. 15 and FIG. 16 is a flow diagram of a method 1500 to verify processes with sidecar technology from application programming interface (API) consumers requesting security tokens, in accordance with some embodiments.

Further, the method 1500 may include a step 1504 of receiving an initial call process with an API Key, API Secure Key, Connection Key, Group Key, and Token Duration Key from a consumer connect 1502.

Further, the method 1500 may include a step 1506 of determining a validity of an access/secure key. If the access/secure key is not valid the method 1500 may include a step of transmitting a failed response code and a description to the consumer connect 1502. If the access/secure key is valid the method 1500 may include a step of transmitting a process session key to the consumer connect 1502. If the access/secure key is valid the method 1500 may include a step 1508 of obtaining a response and a sidecar response.

Further, the method 1500 may include a step of transmitting a process session key and a token to a consumer sidecar 1510 based on the obtaining.

Further, the method 1500 may include a step of transmitting a process session key and a sidecar key to the consumer sidecar 1510.

Further, the method 1500 may include a step 1604 of receiving a token with a connect key, a route key, and a group key from a consumer token owner 1602.

Further, the method 1500 may include a step 1606 of determining a validity of the token. If the token is not valid, the method 1500 may include a step of transmitting a failed response code to the consumer connect 1502. Further, if the token is valid, the method 1500 may include a step of transmitting a process session key to the consumer connect 1502. Further, if the token is valid, the method 1500 may include contacting the consumer token owner using a sidecar 1608. Further, the contacting may include calling a consumer using a consumer sidecar 1610 based on a process session key and the token and obtaining a sidecar key.

Further, the method 1500 may include a step 1612 of determining a validity of an unencrypted token with the sidecar key and an inter key. If the unencrypted token with the sidecar key and the inter key is valid, the method 1500 may include a step of transmitting a process session key and the access key to the consumer sidecar 1510. If the unencrypted token with the sidecar key and the inter key is not valid, the method 1500 may include a step of transmitting a process session key and an invalid token to the consumer sidecar 1510.

FIG. 1 is an illustration of an online platform 100 consistent with various embodiments of the present disclosure. By way of non-limiting example, the online platform 100 may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to the Internet. Further, users of the online platform 100 may include relevant parties such as, but not limited to, end-users, administrators, service providers, service consumers, and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 200.

Figure 2:
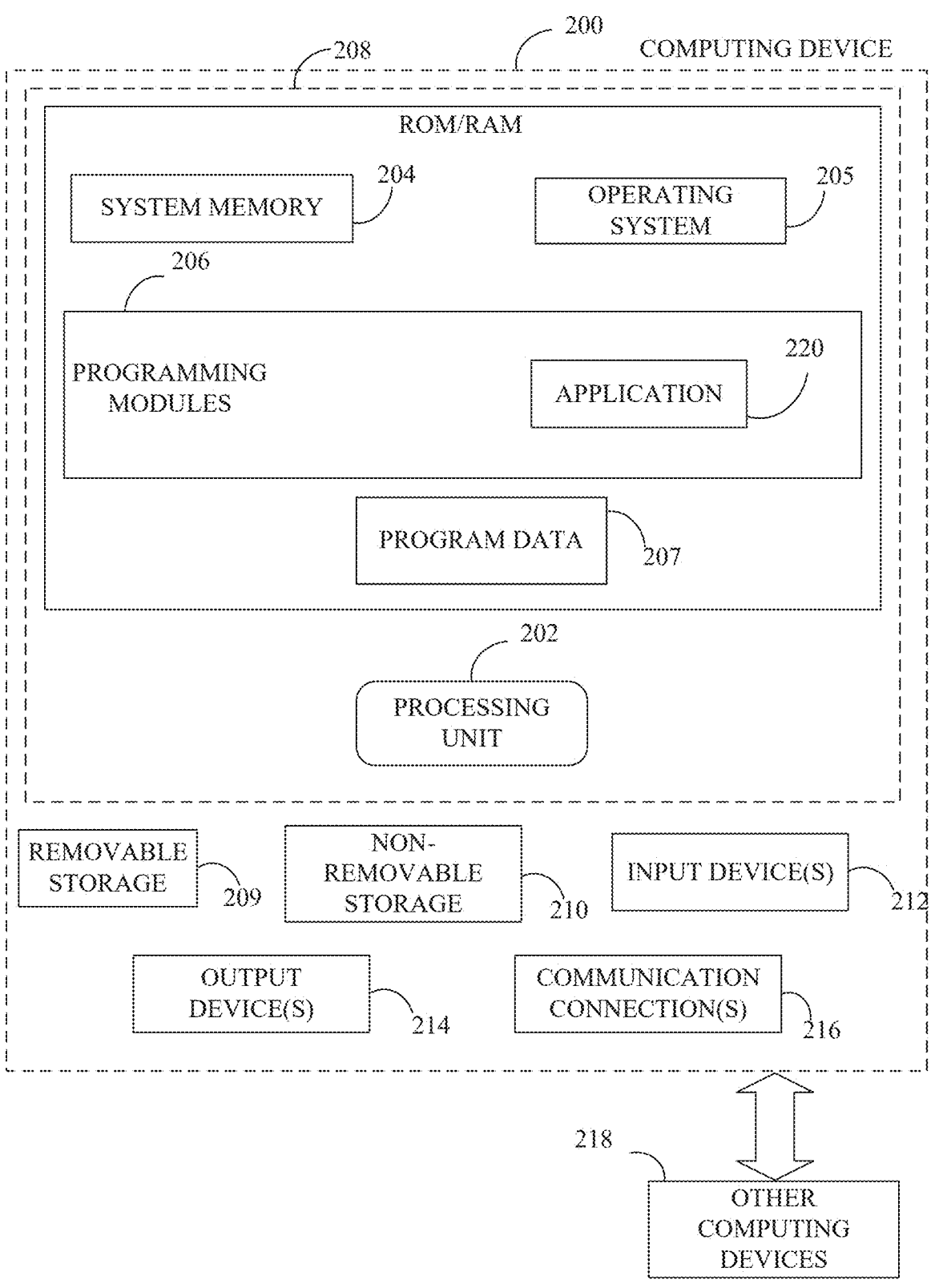
FIG. 2 is a block diagram of a computing device 200 for implementing the methods disclosed herein, in accordance with some embodiments.

With reference to FIG. 2, a system consistent with an embodiment of the disclosure may include a computing device or cloud service, such as computing device 200. In a basic configuration, computing device 200 may include at least one processing unit 202 and a system memory 204. Depending on the configuration and type of computing device, system memory 204 may comprise, but is not limited to, volatile (e.g. random-access memory (RAM)), nonvolatile (e.g. read-only memory (ROM)), flash memory, or any combination. System memory 204 may include operating system 205, one or more programming modules 206, and may include a program data 207. Operating system 205, for example, may be suitable for controlling computing device 200's operation. In one embodiment, programming modules 206 may include image-processing module, machine learning module. Furthermore, embodiments of the disclosure may be practiced in conjunction with a graphics library, other operating systems, or any other application program and is not limited to any particular application or system. This basic configuration is illustrated in FIG. 2 by those components within a dashed line 208.

Computing device 200 may have additional features or functionality. For example, computing device 200 may also include additional data storage devices (removable and/or non-removable) such as, for example, magnetic disks, optical disks, or tape. Such additional storage is illustrated in FIG. 2 by a removable storage 209 and a non-removable storage 210. Computer storage media may include volatile and non-volatile, removable, and non-removable media implemented in any method or technology for storage of information, such as computer-readable instructions, data structures, program modules, or other data. System memory 204, removable storage 209, and non-removable storage 210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD), or other optical storage, magnetic cassettes, magnetic tape, magnetic disk storage or other magnetic storage devices, or any other medium which can be used to store information and which can be accessed by computing device 200. Any such computer storage media may be part of device 200. Computing device 200 may also have input device(s) 212 such as a keyboard, a mouse, a pen, a sound input device, a touch input device, a location sensor, a camera, a biometric sensor, etc. Output device(s) 214 such as a display, speakers, a printer, etc. may also be included. The aforementioned devices are examples and others may be used.

Computing device 200 may also contain a communication connection 216 that may allow device 200 to communicate with other computing devices 218, such as over a network in a distributed computing environment, for example, an intranet or the Internet. Communication connection 216 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 204, including operating system 205. While executing on processing unit 202, programming modules 206 (e.g., application 220 such as a media player) may perform processes including, for example, one or more stages of methods, algorithms, systems, applications, servers, databases as described above. The aforementioned process is an example, and processing unit 202 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

FIG. 3A, FIG. 3B, and FIG. 3C illustrate a flowchart of a method 300 of facilitating authentication for accessing a service, in accordance with some embodiments.

Accordingly, the method 300 may include a step 302 of receiving, using a communication device 1202, a first API call from a user device.

In some embodiments, the communication device 1202 includes an electronic device which may be configured to one or more of receive and transmit a data. In some embodiments, the receiving and transmitting of the data may be wireless.

Further, the first API call may be associated with accessing the service. Further, the first API call includes a first key.

In some embodiments, authentication includes verifying the user device based on two or more parameters. In some embodiments, the service may be provided by an application module. Further, the application module may be coupled with the sidecar module 1204. In some embodiments, the authentication may be facilitated by verifying an access request associated with the service. In some embodiments, the first API call includes an initial call. In some embodiments, the first API call includes one or more of an API key, an API secure key, a connection key, a group key, and a token duration key.

In some embodiments, the user device includes one or more of a personal computer, a smart device, and a server. In some embodiments, the user device includes the user sidecar module. In some embodiments, the authentication may be facilitated by a server sidecar module. Further, the server sidecar module interacts with the application module based on the authentication.

Further, the method 300 may include a step 304 of analyzing, using a sidecar module 1204, the first key.

In some embodiments, the sidecar module 1204 includes a specialized module which may be configured to extend a functionality of an application module.

In some embodiments, the analysis of the first key may be based on a machine learning model.

Further, the method 300 may include a step 306 of determining, using the sidecar module 1204, a key validity based data on the analyzing. Further, the key validity data indicates one of a validity of the first key and an invalidity of the first key.

Further, the method 300 may include a step 308 of generating, using the sidecar module 1204, a first process session key based on the key validity data indicating the validity of the first key. Further, the first process session key facilitates verification of a first data received by the user device.

In some embodiments, the first process session key includes a time data corresponding to a finite time period. Further, the first process session key may be usable within the finite time period. In some embodiments, the user device sidecar may be configured to receive a first data based on receiving of the first process session key. In some embodiments, the authentication of the first response may be performed by matching the first process session and the first process session key comprised in the first response.

Further, the method 300 may include a step 310 of transmitting, using the communication device 1202, the first process session key to the user device.

Further, the method 300 may include a step 312 of generating, using the sidecar module 1204, a first response based on the key validity data indicating the validity of the first key. Further, the first response includes a first token.

In some embodiments, the first token includes a timed token comprising of a time data corresponding to a finite period. Further, the first token may be usable within the finite period. In some embodiments, the first token includes a secure time limited unique token.

In some embodiments, the first token may be encrypted based on two or more keys. Further, the two or more keys includes an internal key and a sidecar key. Further, the first response includes the sidecar key.

Further, the method 300 may include a step 314 of transmitting, using the communication device 1202, the first response to a user device sidecar. Further, the first response includes the first process session key. Further, the user device may be configured to verify an authenticity of the first response based on the first process session key comprised in the first response.

Further, the method 300 may include a step 316 of receiving, using the communication device 1202, a second API call. Further, the second API call includes the first token.

In some embodiments, the second API call includes a call associated with accessing the sidecar module 1204.

In some embodiments, the receiving of second API call may be facilitated by a second key. In some embodiments, the second key includes a connect key, a route key, and a group key.

Further, the method 300 may include a step 318 of analyzing, using the sidecar module 1204, the first token.

Further, the method 300 may include a step 320 of determining, using the sidecar module 1204, a token validity based on the analyzing. Further, the token validity includes one of a validity of the first token and an invalidity of the first token.

In some embodiments, the determination of the token validity data may be based on a criterion. Further, the criterion includes a threshold associated with a lifetime of the first token.

Further, the method 300 may include a step 322 of generating, using the sidecar module 1204, a second process session key based on the token validity. Further, the second process session key facilitates verification of a second data received by the user device.

In some embodiments, the first process session key and the second process session may be identical. In some embodiments, the second process session key includes a time data corresponding to a finite time period. Further, the second process session key may be usable within the finite time period. In some embodiments, the authentication of the second response may be performed by matching the second process session and the second process session key comprised in the second response.

Further, the method 300 may include a step 324 of transmitting, using the communication device 1202, the second process session key to the user device.

Further, the method 300 may include a step 326 of generating, using the sidecar module 1204, a second response based on the token validity. Further, the second response includes the second process session key.

Further, the method 300 may include a step 328 of transmitting, using the communication device 1202, the second response to the user device. Further, the user device may be configured to verify an authenticity of the second response based on the second process session key comprised in the second response.

In some embodiments, the encryption includes encoding a data based on a ciphering algorithm. Further, the decoding of the data may be facilitated by a key. In some embodiments, the sidecar key and the internal key may be associated with decoding the first token to generate an unencrypted token.

In some embodiments, the first response includes two or more responses based on the validity of the first key. Further, the two or more responses includes a first sidecar response comprising the first process session key and the first token. Further, the two or more responses includes a second sidecar response comprising the first process session key and the sidecar key.

In some embodiments, the method 500 may further include transmitting, using the communication device 1202, third response comprising the second process session key and the first token. Further, the sidecar key may be received in response to the third response.

Figure 4:
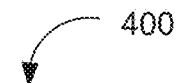
FIG. 4 illustrates a flowchart of a method 400 of facilitating authentication for accessing a service including analyzing, using the sidecar module 1204, the authentication data, in accordance with some embodiments.

FIG. 4 illustrates a flowchart of a method 400 of facilitating authentication for accessing a service including analyzing, using the sidecar module 1204, the authentication data, in accordance with some embodiments.

Further, in some embodiments, the method 400 further may include a step 402 of receiving, using the communication device 1202, an authentication data from an external server based on the first API call. Further, in some embodiments, the method 400 further may include a step 404 of analyzing, using the sidecar module 1204, the authentication data. Further, the generation of the key validity data may be further based on the analyzing.

In some embodiments, the external server includes an Open Authorization server. Further, the authentication data includes a public key associated with the first key. Further, the first key may be verified based on the public key.

FIG. 5 illustrates a flowchart of a method 500 of facilitating authentication for accessing a service including determining, using the sidecar module 1204, an unencrypted token validity, in accordance with some embodiments.

Further, in some embodiments, the method 500 further may include a step 502 of receiving, using the communication device 1202, the sidecar key from the user device. Further, in some embodiments, the method 500 further may include a step 504 of generating, using the sidecar module 1204, an unencrypted token based on decryption of the first token using the sidecar key and the internal key. Further, in some embodiments, the method 500 further may include a step 506 of analyzing, using the sidecar module 1204, the unencrypted token. Further, in some embodiments, the method 500 further may include a step 508 of determining, using the sidecar module 1204, an unencrypted token validity based on the analyzing. Further, the unencrypted token validity indicates one of a validity of the unencrypted token and an invalidity of the unencrypted token. Further, the generation of the second response may be based on the validity of the unencrypted token. Further, the second response further includes an access key for accessing the service.

FIG. 6 illustrates a flowchart of a method 600 of facilitating authentication for accessing a service including determining, using the sidecar module 1204, an unencrypted token validity, in accordance with some embodiments.

Further, in some embodiments, the method 600 further may include a step 602 of receiving, using the communication device 1202, the sidecar key from the user device. Further, in some embodiments, the method 600 further may include a step 604 of generating, using the sidecar module 1204, an unencrypted token based on decryption of the first token using the sidecar key and the internal key. Further, in some embodiments, the method 600 further may include a step 606 of analyzing, using the sidecar module 1204, the unencrypted token. Further, in some embodiments, the method 600 further may include a step 608 of determining, using the sidecar module 1204, an unencrypted token validity based on the analyzing. Further, the unencrypted key validity indicates one of a validity of the unencrypted token and an invalidity of the unencrypted token. Further, generation of the second response may be based on the invalidity of the unencrypted token. Further, the second response further includes a failed token response.

Figure 7:
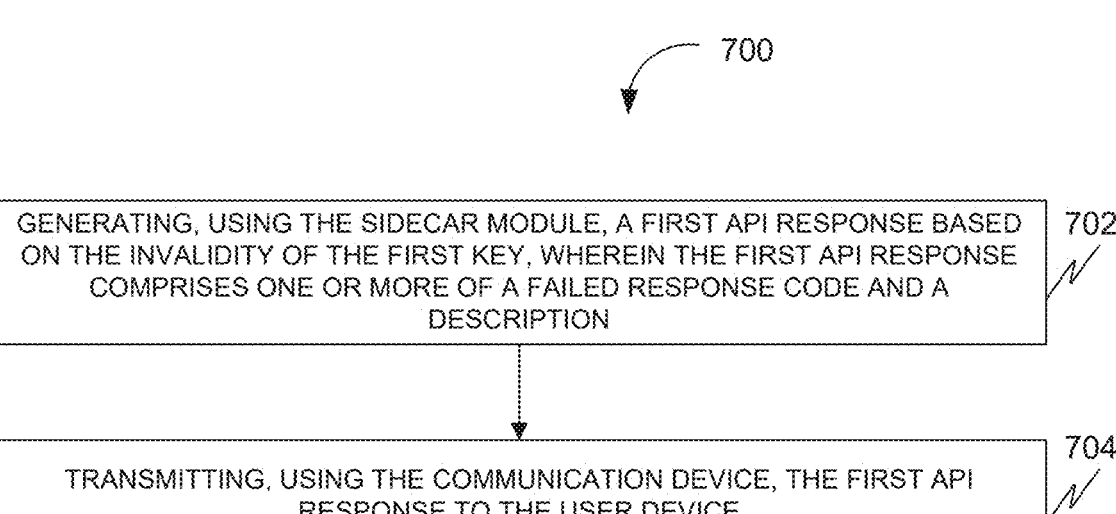
FIG. 7 illustrates a flowchart of a method 700 of facilitating authentication for accessing a service including generating, using the sidecar module 1204, a first API response, in accordance with some embodiments.

FIG. 7 illustrates a flowchart of a method 700 of facilitating authentication for accessing a service including generating, using the sidecar module 1204, a first API response, in accordance with some embodiments.

Further, in some embodiments, the method 700 further may include a step 702 of generating, using the sidecar module 1204, a first API response based on the invalidity of the first key. Further, the first API response includes one or more of a failed response code and a description. Further, in some embodiments, the method 700 further may include a step 704 of transmitting, using the communication device 1202, the first API response to the user device.

FIG. 8A, FIG. 8B, and FIG. 8C illustrate a flowchart of a method 800 of facilitating authentication for accessing a service, in accordance with some embodiments.

Accordingly, the method 800 may include a step 802 of receiving, using a communication device 1202, a first API call from a user device. Further, the first API call may be associated with accessing the service. Further, the first API call includes a first key. Further, the method 800 may include a step 804 of receiving, using a communication device 1202, an authentication data from an external server based on the first API call. Further, the method 800 may include a step 806 of analyzing, using a sidecar module 1204, the first key and the authentication data. Further, the method 800 may include a step 808 of determining, using the sidecar module 1204, a key validity based data on the analyzing. Further, the key validity data indicates one of a validity of the first key and an invalidity of the first key. Further, the method 800 may include a step 810 of generating, using the sidecar module 1204, a first process session key based on the key validity data indicating the validity of the first key. Further, the first process session key facilitates verification of a first data received by the user device. Further, the method 800 may include a step 812 of transmitting, using the communication device 1202, the first process session key to the user device. Further, the method 800 may include a step 814 of generating, using the sidecar module 1204, a first response based on the key validity data indicating the validity of the first key. Further, the first response includes a first token. Further, the method 800 may include a step 816 of transmitting, using the communication device 1202, the first response to a user device sidecar. Further, the first response includes the first process session key. Further, the user device may be configured to verify an authenticity of the first response based on the first process session key comprised in the first response. Further, the method 800 may include a step 818 of receiving, using the communication device 1202, a second API call. Further, the second API call includes the first token. Further, the method 800 may include a step 820 of analyzing, using the sidecar module 1204, the first token. Further, the method 800 may include a step 822 of determining, using the sidecar module 1204, a token validity based on the analyzing. Further, the token validity includes one of a validity of the first token and an invalidity of the first token. Further, the method 800 may include a step 824 of generating, using the sidecar module 1204, a second process session key based on the token validity indicating the validity of the first token. Further, the second process session key facilitates verification of a second data received by the user device. Further, the method 800 may include a step 826 of transmitting, using the communication device 1202, the second process session key to the user device. Further, the method 800 may include a step 828 of generating, using the sidecar module 1204, a second response based on the token validity indicating the validity of the first token. Further, the second response includes the second process session key. Further, the method 800 may include a step 830 of transmitting, using the communication device 1202, the second response to the user device. Further, the user device may be configured to verify an authenticity of the second response based on the second process session key comprised in the second response.

In some embodiments, the first token may be encrypted based on two or more keys. Further, the two or more keys includes an internal key and a sidecar key. Further, the first response includes the sidecar key.

In some embodiments, the first response includes two or more responses based on the validity of the first key. Further, the two or more responses includes a first sidecar response comprising the first process session key and the first token. Further, the two or more responses includes a second sidecar response comprising the first process session key and the sidecar key.

FIG. 9 illustrates a flowchart of a method 900 of facilitating authentication for accessing a service including determining, using the sidecar module 1204, an unencrypted token validity, in accordance with some embodiments.

Further, in some embodiments, the method 900 further may include a step 902 of receiving, using the communication device 1202, the sidecar key from the user device. Further, in some embodiments, the method 900 further may include a step 904 of generating, using the sidecar module 1204, an unencrypted token based on decryption of the first token using the sidecar key and the internal key. Further, in some embodiments, the method 900 further may include a step 906 of analyzing, using the sidecar module 1204, the unencrypted token. Further, in some embodiments, the method 900 further may include a step 908 of determining, using the sidecar module 1204, an unencrypted token validity based on the analyzing. Further, the unencrypted key validity indicates one of a validity of the unencrypted token and an invalidity of the unencrypted token. Further, the generation of the second response may be based on the validity of the unencrypted token. Further, the second response further includes an access key for accessing the service.

FIG. 10 illustrates a flowchart of a method 1000 of facilitating authentication for accessing a service including determining, using the sidecar module 1204, an unencrypted token validity, in accordance with some embodiments.

Further, in some embodiments, the method 1000 further may include a step 1002 of receiving, using the communication device 1202, the sidecar key from the user device. Further, in some embodiments, the method 1000 further may include a step 1004 of generating, using the sidecar module 1204, an unencrypted token based on decryption of the first token using the sidecar key and the internal key. Further, in some embodiments, the method 1000 further may include a step 1006 of analyzing, using the sidecar module 1204, the unencrypted token. Further, in some embodiments, the method 1000 further may include a step 1008 of determining, using the sidecar module 1204, an unencrypted token validity based on the analyzing. Further, the unencrypted key validity indicates one of a validity of the unencrypted token and an invalidity of the unencrypted token. Further, generation of the second response may be based on the invalidity of the unencrypted token. Further, the second response further includes a failed token response.

FIG. 11 illustrates a flowchart of a method 1100 of facilitating authentication for accessing a service including generating, using the sidecar module 1204, a first API response, in accordance with some embodiments.

Further, in some embodiments, the method 1100 further may include a step 1102 of generating, using the sidecar module 1204, a first API response based on the invalidity of the first key. Further, the first API response includes one or more of a failed response code and a description. Further, in some embodiments, the method 1100 further may include a step 1104 of transmitting, using the communication device 1202, the first API response to the user device.

Figure 12:
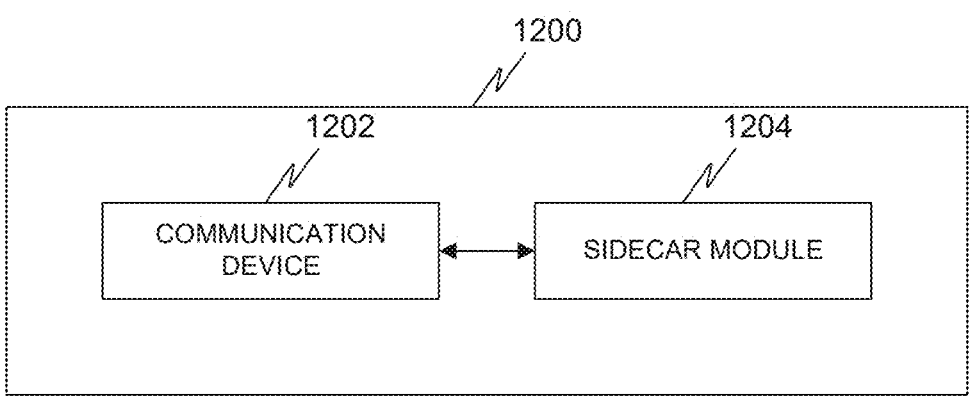
FIG. 12 illustrates a block diagram of a system 1200 of facilitating authentication for accessing a service, in accordance with some embodiments.

FIG. 12 illustrates a block diagram of a system 1200 of facilitating authentication for accessing a service, in accordance with some embodiments.

Accordingly, the system 1200 may include a communication device 1202. Further, the communication device 1202 may be configured to receive a first API call from a user device. Further, the first API call may be associated with accessing the service. Further, the first API call includes a first key. Further, the communication device 1202 may be configured to transmit a first process session key to the user device. Further, the communication device 1202 may be configured to transmit a first response to a user device sidecar. Further, the first response includes the first process session key. Further, the user device may be configured to verify an authenticity of the first response based on the first process session key comprised in the first response. Further, the communication device 1202 may be configured to receive a second API call. Further, the second API call includes the first token. Further, the communication device 1202 may be configured to transmit a second process session key to the user device. Further, the communication device 1202 may be configured to transmit a second response to the user device sidecar. Further, the user device may be configured to verify an authenticity of the second response based on the second process session key comprised in the second response. Further, the system 1200 may include a sidecar module 1204 communicatively coupled with the communication device 1202. Further, the sidecar module 1204 may be configured to analyze the first key. Further, the sidecar module 1204 may be configured to determine a key validity based data on the analyzing. Further, the key validity data indicates one of a validity of the first key and an invalidity of the first key. Further, the sidecar module 1204 may be configured to generate the first process session key based on the key validity data indicating the validity of the first key. Further, the sidecar module 1204 may be configured to generate the first response based on the key validity data indicating the validity of the first key. Further, the first response includes a first token. Further, the sidecar module 1204 may be configured to analyze the first token. Further, the sidecar module 1204 may be configured to determine a token validity based on the analyzing. Further, the token validity indicates one of a validity of the first token and an invalidity of the first token. Further, the sidecar module 1204 may be configured to generate the second process session key based on the token validity indicating the validity of the first token. Further, the sidecar module 1204 may be configured to generate the second response based on the token validity indicating validity of the first token. Further, the second response includes the second process session key.

In some embodiments, the communication device 1202 may be further configured to receive an authentication data from an external server based on the first API call. Further, the sidecar module 1204 may be further configured to analyze the authentication data. Further, the generation of the key validity data may be further based on the analyzing.

In some embodiments, the first token may be encrypted based on two or more keys. Further, the two or more keys includes an internal key and a sidecar key. Further, the first response includes the sidecar key.

In some embodiments, the first response includes two or more responses based on the validity of the first key. Further, the two or more responses includes a first sidecar response comprising the first process session key and the first token.

Further, the two or more responses includes a second sidecar response comprising the first process session key and the sidecar key.

Further, in some embodiments, the communication device 1202 may be further configured to receive the sidecar key from the user device. Further, the sidecar module 1204 may be further configured to generate an unencrypted token based on decryption of the first token using the sidecar key and the internal key. Further, the sidecar module 1204 may be further configured to analyze the unencrypted token. Further, the sidecar module 1204 may be further configured to determine an unencrypted token validity based on the analyzing. Further, the unencrypted key validity indicates one of a validity of the unencrypted token and an invalidity of the unencrypted token. Further, the generation of the second response may be based on the validity of the unencrypted token.

Further, in some embodiments, the communication device 1202 may be further configured to receive the sidecar key from the user device. Further, the sidecar module 1204 may be further configured to generate an unencrypted token based on decryption of the first token using the sidecar key and the internal key. Further, the sidecar module 1204 may be further configured to analyze the unencrypted token. Further, the sidecar module 1204 may be further configured to determine an unencrypted token validity based on the analyzing. Further, the unencrypted key validity indicates one of a validity of the unencrypted token and an invalidity of the unencrypted token. Further, generation of the second response may be based on the invalidity of the unencrypted token. Further, the second response further includes a failed token response.

In some embodiments, the sidecar module 1204 may be further configured to generate a first API response based on the invalidity of the first key. Further, the first API response includes one or more of a failed response code and a description. Further, the communication device 1202 may be further configured to transmit the first API response to the user device.

Although the invention has been explained in relation to its preferred embodiment, it is to be understood that many other possible modifications and variations can be made without departing from the spirit and scope of the invention as hereinafter claimed.

What is claimed is:

1. A method of facilitating authentication for accessing a service, the method comprises:

receiving, using a communication device, a first API call from a user device, wherein the first API call is associated with accessing the service, wherein the first API call comprises a first key;

analyzing, using a sidecar module, the first key;

determining, using the sidecar module, a key validity based data on the analyzing, wherein the key validity data indicates one of a validity of the first key and an invalidity of the first key;

generating, using the sidecar module, a first process session key based on the key validity data indicating the validity of the first key, wherein the first process session key facilitates verification of a first data received by the user device;

transmitting, using the communication device, the first process session key to the user device;

generating, using the sidecar module, a first response based on the key validity data indicating the validity of the first key, wherein the first response comprises a first token;

transmitting, using the communication device, the first response to a user device sidecar, wherein the first response comprises the first process session key, wherein the user device is configured to verify an authenticity of the first response based on the first process session key comprised in the first response;

receiving, using the communication device, a second API call, wherein the second API call comprises the first token;

analyzing, using the sidecar module, the first token;

determining, using the sidecar module, a token validity based on the analyzing, wherein the token validity comprises one of a validity of the first token and an invalidity of the first token;

generating, using the sidecar module, a second process session key based on the token validity indicating the validity of the first token, wherein the second process session key facilitates verification of a second data received by the user device;

transmitting, using the communication device, the second process session key to the user device;

generating, using the sidecar module, a second response based on the token validity indicating the validity of the first token, wherein the second response comprises the second process session key;

transmitting, using the communication device, the second response to the user device, wherein the user device is configured to verify an authenticity of the second response based on the second process session key comprised in the second response.

2. The method of claim 1 further comprising:

receiving, using the communication device, an authentication data from an external server based on the first API call;

analyzing, using the sidecar module, the authentication data, wherein the generation of the key validity data is further based on the analyzing.

3. The method of claim 1, wherein the first token is encrypted based on a plurality of keys, wherein the plurality of keys comprises an internal key and a sidecar key, wherein the first response comprises the sidecar key.

4. The method of claim 3, wherein the first response comprises a plurality of responses based on the validity of the first key, wherein the plurality of responses comprises a first sidecar response comprising the first process session key and the first token, wherein the plurality of responses comprises a second sidecar response comprising the first process session key and the sidecar key.

5. The method of claim 4 further comprising:

receiving, using the communication device, the sidecar key from the user device;

generating, using the sidecar module, an unencrypted token based on decryption of the first token using the sidecar key and the internal key;

analyzing, using the sidecar module, the unencrypted token;

determining, using the sidecar module, an unencrypted token validity based on the analyzing, wherein the unencrypted token validity indicates one of a validity of the unencrypted token and an invalidity of the unencrypted token, wherein the generation of the second response is based on the validity of the unencrypted token, wherein the second response further comprises an access key for accessing the service.

6. The method of claim 4 further comprising:

receiving, using the communication device, the sidecar key from the user device;

generating, using the sidecar module, an unencrypted token based on decryption of the first token using the sidecar key and the internal key;

analyzing, using the sidecar module, the unencrypted token;

determining, using the sidecar module, an unencrypted token validity based on the analyzing, wherein the unencrypted key validity indicates one of a validity of the unencrypted token and an invalidity of the unencrypted token, wherein generation of the second response is based on the invalidity of the unencrypted token, wherein the second response further comprises a failed token response.

7. The method of claim 1 further comprises:

generating, using the sidecar module, a first API response based on the invalidity of the first key, wherein the first API response comprises one or more of a failed response code and a description; and transmitting, using the communication device, the first API response to the user device.

8. A method of facilitating authentication for accessing a service, the method comprises:

receiving, using a communication device, a first API call from a user device, wherein the first API call is associated with accessing the service, wherein the first API call comprises a first key;

receiving, using a communication device, an authentication data from an external server based on the first API call;

analyzing, using a sidecar module, the first key and the authentication data;

determining, using the sidecar module, a key validity based data on the analyzing, wherein the key validity data indicates one of a validity of the first key and an invalidity of the first key;

generating, using the sidecar module, a first process session key based on the key validity data indicating the validity of the first key, wherein the first process session key facilitates verification of a first data received by the user device;

transmitting, using the communication device, the first process session key to the user device;

generating, using the sidecar module, a first response based on the key validity data indicating the validity of the first key, wherein the first response comprises a first token;

transmitting, using the communication device, the first response to a user device sidecar, wherein the first response comprises the first process session key, wherein the user device is configured to verify an authenticity of the first response based on the first process session key comprised in the first response;

receiving, using the communication device, a second API call, wherein the second API call comprises the first token;

analyzing, using the sidecar module, the first token;

determining, using the sidecar module, a token validity based on the analyzing, wherein the token validity comprises one of a validity of the first token and an invalidity of the first token;

generating, using the sidecar module, a second process session key based on the token validity indicating the validity of the first token, wherein the second process session key facilitates verification of a second data received by the user device;

transmitting, using the communication device, the second process session key to the user device;

generating, using the sidecar module, a second response based on the token validity indicating the validity of the first token, wherein the second response comprises the second process session key;

transmitting, using the communication device, the second response to the user device, wherein the user device is configured to verify an authenticity of the second response based on the second process session key comprised in the second response.

9. The method of claim 8, wherein the first token is encrypted based on a plurality of keys, wherein the plurality of keys comprises an internal key and a sidecar key, wherein the first response comprises the sidecar key.

10. The method of claim 9, wherein the first response comprises a plurality of responses based on the validity of the first key, wherein the plurality of responses comprises a first sidecar response comprising the first process session key and the first token, wherein the plurality of responses comprises a second sidecar response comprising the first process session key and the sidecar key.

11. The method of claim 10 further comprising:

receiving, using the communication device, the sidecar key from the user device;

generating, using the sidecar module, an unencrypted token based on decryption of the first token using the sidecar key and the internal key;

analyzing, using the sidecar module, the unencrypted token;

determining, using the sidecar module, an unencrypted token validity based on the analyzing, wherein the unencrypted key validity indicates one of a validity of the unencrypted token and an invalidity of the unencrypted token, wherein the generation of the second response is based on the validity of the unencrypted token, wherein the second response further comprises an access key for accessing the service.

12. The method of claim 10 further comprising:

receiving, using the communication device, the sidecar key from the user device;

generating, using the sidecar module, an unencrypted token based on decryption of the first token using the sidecar key and the internal key;

analyzing, using the sidecar module, the unencrypted token;

determining, using the sidecar module, an unencrypted token validity based on the analyzing, wherein the unencrypted key validity indicates one of a validity of the unencrypted token and an invalidity of the unencrypted token, wherein generation of the second response is based on the invalidity of the unencrypted token, wherein the second response further comprises a failed token response.

13. The method of claim 8 further comprises:

generating, using the sidecar module, a first API response based on the invalidity of the first key, wherein the first API response comprises one or more of a failed response code and a description;

transmitting, using the communication device, the first API response to the user device.

14. A system for facilitating authentication for accessing a service, the system comprises:

a communication device configured to:

receive a first API call from a user device, wherein the first API call is associated with accessing the service, wherein the first API call comprises a first key;

transmit a first process session key to the user device;

transmit a first response to a user device sidecar, wherein the first response comprises the first process session key, wherein the user device is configured to verify an authenticity of the first response based on the first process session key comprised in the first response;

receive a second API call, wherein the second API call comprises the first token;

transmit a second process session key to the user device;

transmit a second response to the user device sidecar, wherein the user device is configured to verify an authenticity of the second response based on the second process session key comprised in the second response, wherein the second response; and a sidecar module communicatively coupled with the communication device, wherein the sidecar module is configured to:

analyze the first key;

determine a key validity based data on the analyzing, wherein the key validity data indicates one of a validity of the first key and an invalidity of the first key;

generate the first process session key based on the key validity data indicating the validity of the first key;

generate the first response based on the key validity data indicating the validity of the first key, wherein the first response comprises a first token;

analyze the first token;

determine a token validity based on the analyzing, wherein the token validity indicates one of a validity of the first token and an invalidity of the first token;

generate the second process session key based on the token validity indicating the validity of the first token; and generate the second response based on the token validity indicating the validity of the first token, wherein the second response comprises the second process session key.

15. The system of claim 14, wherein the communication device is further configured to receive an authentication data from an external server based on the first API call, wherein the sidecar module is further configured to analyze the authentication data, wherein the generation of the key validity data is further based on the analyzing.

16. The system of claim 14, wherein the first token is encrypted based on a plurality of keys, wherein the plurality of keys comprises an internal key and a sidecar key, wherein the first response comprises the sidecar key.

17. The system of claim 16, wherein the first response comprises a plurality of responses based on the validity of the first key, wherein the plurality of responses comprises a first sidecar response comprising the first process session key and the first token, wherein the plurality of responses comprises a second sidecar response comprising the first process session key and the sidecar key.

18. The system of claim 17, wherein the communication device is further configured to receive the sidecar key from the user device, wherein the sidecar module is further configured to:

generate an unencrypted token based on decryption of the first token using the sidecar key and the internal key;

analyze the unencrypted token;

determine an unencrypted token validity based on the analyzing, wherein the unencrypted key validity indicates one of a validity of the unencrypted token and an invalidity of the unencrypted token, wherein the generation of the second response is based on the validity of the unencrypted token, wherein the second response further comprises an access key for accessing the service.

19. The system of claim 17, wherein the communication device is further configured to receive the sidecar key from the user device, wherein the sidecar module is further configured to:

generate an unencrypted token based on decryption of the first token using the sidecar key and the internal key;

analyze the unencrypted token;

determine an unencrypted token validity based on the analyzing, wherein the unencrypted key validity indicates one of a validity of the unencrypted token and an invalidity of the unencrypted token, wherein generation of the second response is based on the invalidity of the unencrypted token, wherein the second response further comprises a failed token response.

20. The system of claim 14, wherein the sidecar module is further configured to generate a first API response based on the invalidity of the first key, wherein the first API response comprises one or more of a failed response code and a description, wherein the communication device is further configured to transmit the first API response to the user device.

\* \* \* \* \*